(12) United States Patent
Luscombe et al.

(10) Patent No.: US 12,129,650 B2
(45) Date of Patent: Oct. 29, 2024

(54) ASSEMBLY FOR BRACING SUSPENDED NON-STRUCTURAL BUILDING COMPONENTS

(71) Applicant: POLYPAS INTERNATIONAL PTY LTD, Rowville (AU)

(72) Inventors: Peter Luscombe, Rowville (AU); John Van Vuuren, Rowville (AU); James Renshaw, Rowville (AU); Lachlan Rhodes, Rowville (AU); Tinus Smith, Rowville (AU); Daryl Wong, Rowville (AU)

(73) Assignee: POLYPAS INTERNATIONAL PTY LTD, Rowville (AU)

( * ) Notice: Subject to any disclaimer, the term of this patent is extended or adjusted under 35 U.S.C. 154(b) by 200 days.

(21) Appl. No.: 17/618,548

(22) PCT Filed: Jun. 11, 2020

(86) PCT No.: PCT/AU2020/050592
§ 371 (c)(1),
(2) Date: Dec. 13, 2021

(87) PCT Pub. No.: WO2020/248016
PCT Pub. Date: Dec. 17, 2020

(65) Prior Publication Data
US 2022/0243467 A1    Aug. 4, 2022

(30) Foreign Application Priority Data

Jun. 11, 2019 (AU) .............................. 2019902020

(51) Int. Cl.
*E04B 9/00* (2006.01)
*E04B 9/18* (2006.01)
(Continued)

(52) U.S. Cl.
CPC ............... *E04B 9/006* (2013.01); *E04B 9/18* (2013.01); *E04B 9/22* (2013.01); *F16B 2/065* (2013.01);
(Continued)

(58) Field of Classification Search
CPC ...... F16L 3/26; E04B 2001/389; E04B 9/006; E04B 9/22; E04B 9/18; F16B 2/065; F24F 13/0254
(Continued)

(56) References Cited

U.S. PATENT DOCUMENTS 4,065,218 A  *  12/1977  Biggane .................... E04C 3/02
                                                   52/693
4,078,752 A  *   3/1978  Kindorf .................... F16L 3/00
                                                   248/62

(Continued)

FOREIGN PATENT DOCUMENTS

DE         19532681 A1    3/1997
KR      2020080002087 U    6/2008
(Continued)

OTHER PUBLICATIONS

Extended European Search Report received for EP Application No. 20822373.5, mailed on May 30, 2023, 8 Pages.
(Continued)

*Primary Examiner* — Brent W Herring
(74) *Attorney, Agent, or Firm* — EcoTech Law Group, P.C.

(57) ABSTRACT

An assembly for bracing a non-structural building component mounted adjacent a surface of a building. The assembly has a rigid elongate member, and first and second mounts. In use, the assembly is to be installed between the surface and the non-structural component, with the first mount secured by a fastener to one of the building and the non-structural
(Continued)

component, the second mount secured by a fastener to the other of the non-structural component and the building, and the elongate member extending between the first and second mounts and rigidly fixed thereto. The first mount includes an attachment portion, and a connecting portion that is rigidly joined to the attachment portion and that projects away from the attachment portion. The connecting portion defines a fixing element that has a second mounting face, and one or more through-holes that each extend through the respective fixing element in a direction that is generally transverse to the projecting direction of the connecting portion and opens onto the second mounting face. The elongate member is fixable to the first mount by locating the planar wall portion of the elongate member adjacent the second mounting face, and passing fasteners through the through-holes so as to engage the wall portion of the elongate member and thereby secure the elongate member to the first mount.

19 Claims, 20 Drawing Sheets

(51) Int. Cl.
    *E04B 9/22*         (2006.01)
    *F16B 2/06*         (2006.01)
    *F16L 3/26*         (2006.01)
    *F24F 13/02*       (2006.01)
    *E04B 1/38*        (2006.01)
(52) U.S. Cl.
    CPC ............ *F16L 3/26* (2013.01); *F24F 13/0254* (2013.01); *E04B 2001/389* (2023.08)
(58) Field of Classification Search
    USPC .................................................... 52/79.9, 39
    See application file for complete search history.

(56) References Cited

U.S. PATENT DOCUMENTS

| | | | |
|---|---|---|---|
| 4,084,364 A * | 4/1978 | Jones .................... | E04B 9/18 52/39 |
| 4,361,099 A * | 11/1982 | Kokenge ............... | A47B 96/061 108/134 |
| 5,188,317 A * | 2/1993 | Roth ....................... | H02G 3/26 248/62 |
| 5,702,218 A * | 12/1997 | Onofrio ................... | E04B 9/20 411/341 |
| 6,415,560 B1 * | 7/2002 | Rinderer ................. | F16B 7/18 403/220 |
| 6,837,009 B1 * | 1/2005 | Roth ....................... | F16B 9/05 24/563 |
| 9,777,870 B2 | 10/2017 | Roth | |
| 10,054,143 B2 | 8/2018 | Allmon | |
| 2004/0020140 A1 | 2/2004 | Allmon et al. | |
| 2006/0024127 A1 | 2/2006 | Heath | |
| 2016/0208838 A1 * | 7/2016 | Allmon ................... | F16B 2/065 |
| 2016/0252197 A1 | 9/2016 | Roth | |
| 2016/0289957 A1 * | 10/2016 | Roth ........................ | F16L 3/11 |

FOREIGN PATENT DOCUMENTS

| | | |
|---|---|---|
| KR | 2020150004164 U | 11/2015 |
| KR | 1020190007138 A | 1/2019 |

OTHER PUBLICATIONS

International Search Report and Written Opinion received for International PCT Application No. PCT/AU2020/050592, mailed on Aug. 17, 2020, 11 Pages.

* cited by examiner

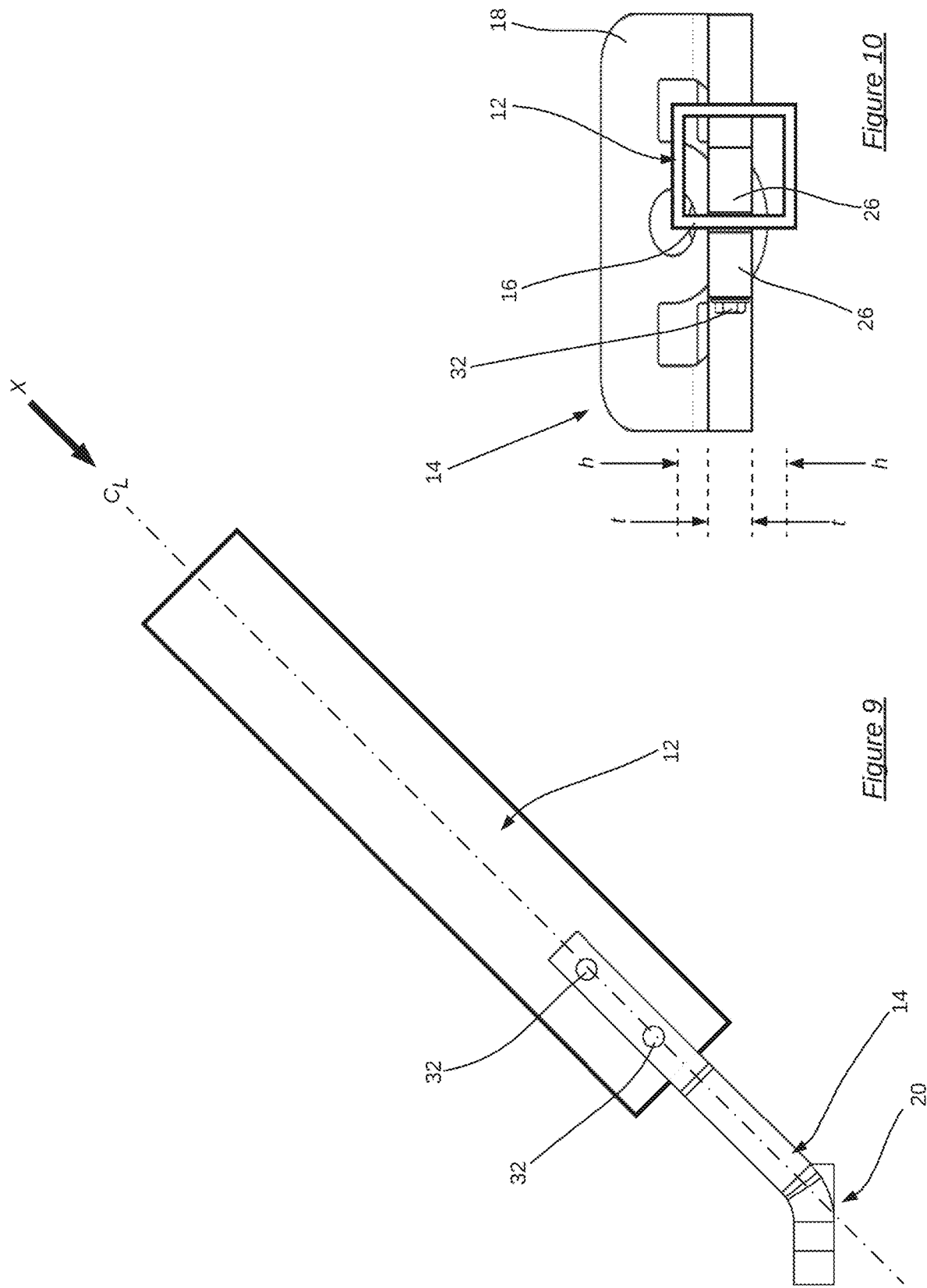

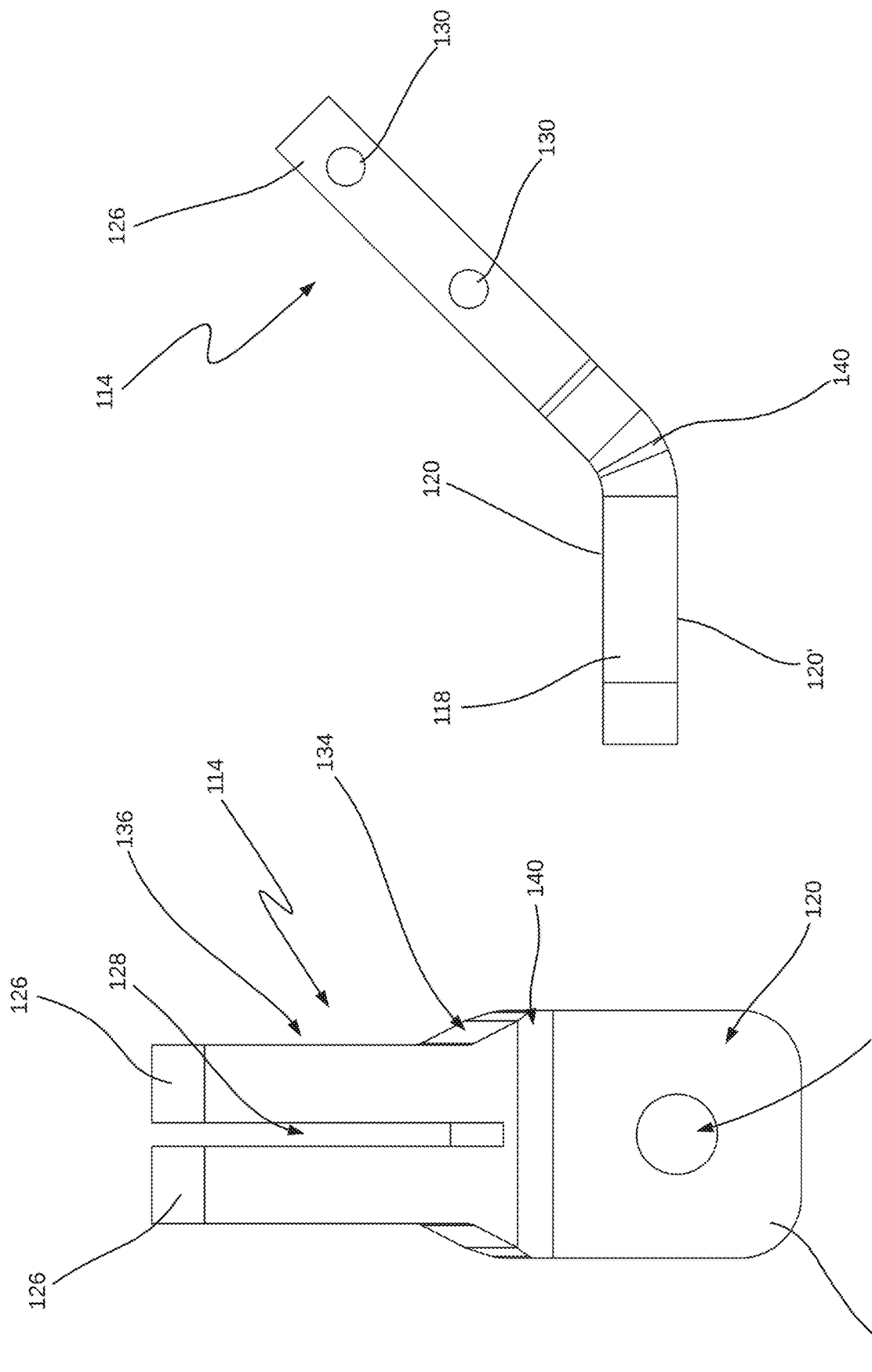

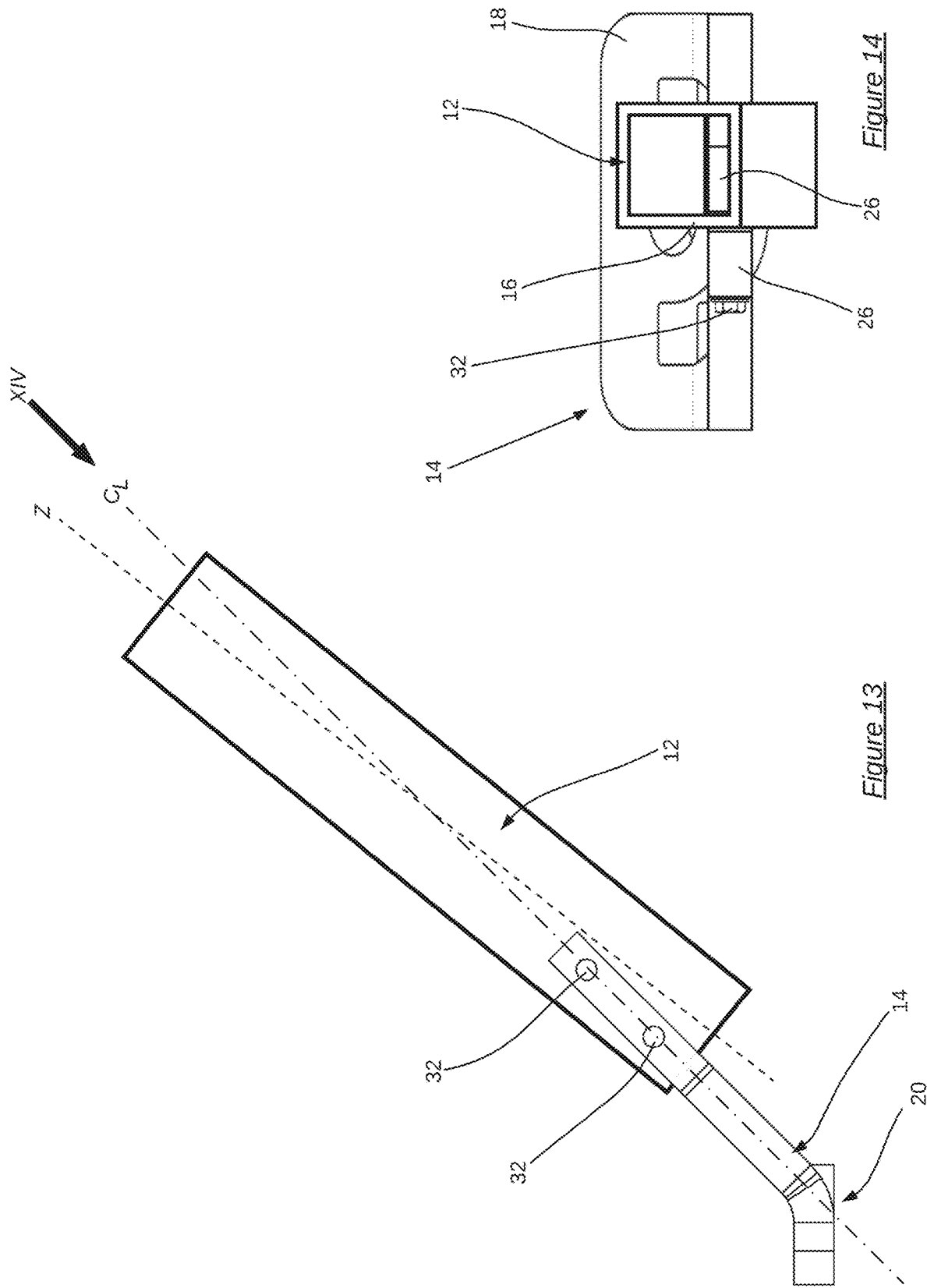

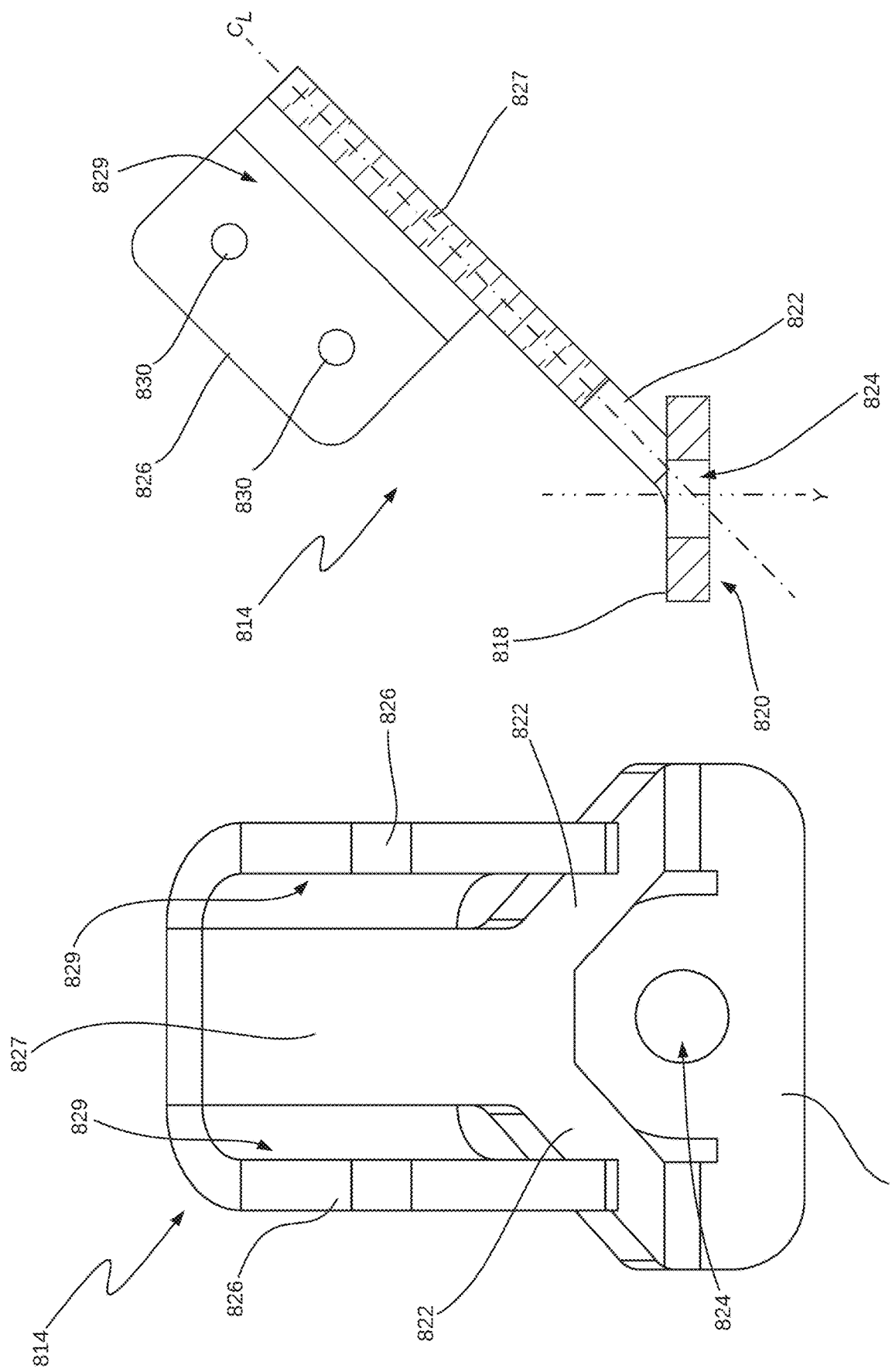

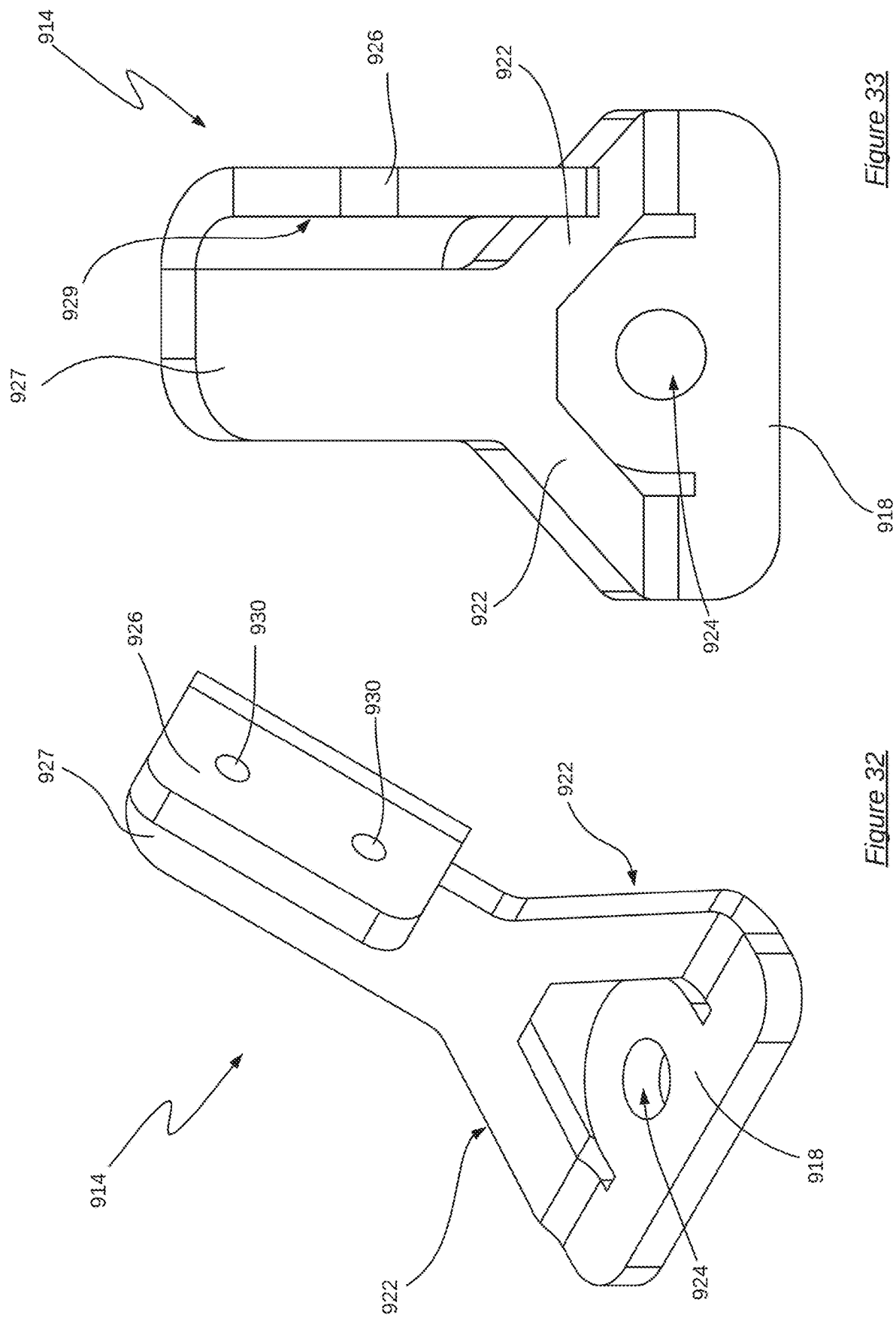

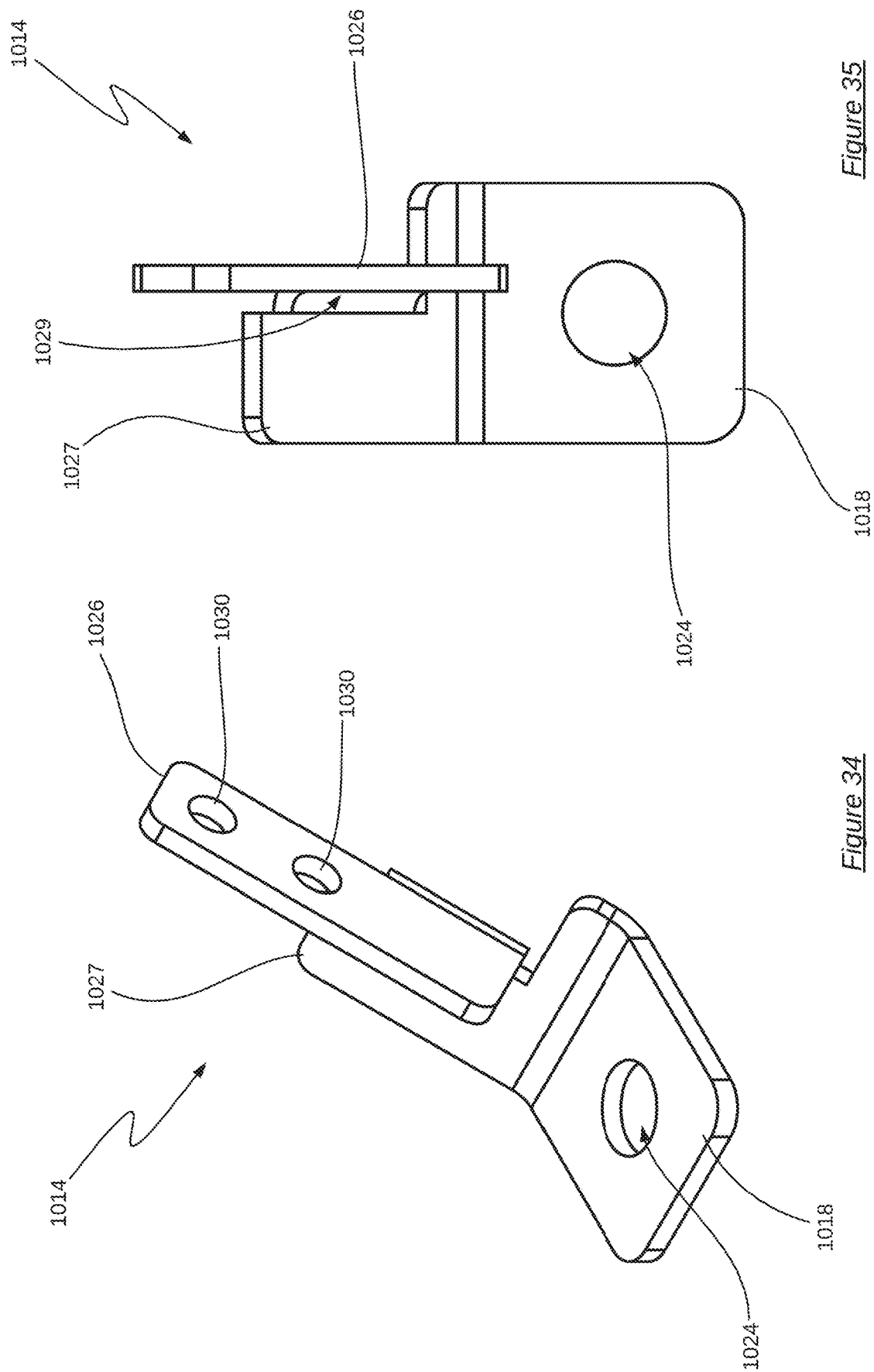

ASSEMBLY FOR BRACING SUSPENDED NON-STRUCTURAL BUILDING COMPONENTS

RELATED APPLICATION

This application is a National Stage Application of PCT/AU2020/050592 filed on Jun. 11, 2020, which is incorporated herein by reference for all purpose.

FIELD OF THE INVENTION

The present invention relates to an assembly for bracing suspended non-structural building components.

BACKGROUND

Non-structural building components are used in the functioning of many buildings to distribute building services, such as electrical power and data, water, gas, and ventilation and refrigeration. It is common for non-structural building components to be suspended beneath a soffit of the building, and/or supported adjacent a vertical wall of the building.

It is known to support non-structural building components in an elevated position beneath a soffit using suspension hangers, such as a rigid threaded rod. The upper end of the suspension hanger is embedded in (or otherwise secured to) a soffit. The building service components are then secured to the lower end of the suspension hanger using internally threaded nuts, and other fastening components.

In some instances, it is critical that buildings and the components are properly protected and are likely to continue to operate after an event in which the building is subject to substantial shock and/or vibration. Such events include earthquakes and other seismic events, and commercial blasts. In these instances, the non-structural components need to be braced so as to receive minimal damage. In order to withstand such events, it is known to provide rigid bracing to limit the lateral movement of the suspended non-structural building components.

Typically, a non-structural building component will be supported by multiple bracing assemblies so as to be supported in multiple planes. Under dynamic loading, rigid bracing components can be subjected to high shock and torsion loads. In order for the loads to be managed in each installed assembly, it is known to install more bracing assemblies at closer spacing. This leads to high construction and maintenance costs.

There is a need to address the above, and/or at least provide a useful alternative.

SUMMARY

There is provided an assembly for bracing a non-structural building component mounted adjacent a surface of a building, the assembly comprising:
a rigid elongate member having first and second ends, and one or more substantially planar wall portions that extend at least part of the length of the elongate member from a respective end;
a first mount that includes:
    an attachment portion with a first mounting point through which a first fastener is to extend to secure the first mount to one of: the non-structural component or the building, the attachment portion having a substantially planar first mounting face that in use of the assembly is to be oriented towards the respective non-structural component or the surface of the building, and
    at least one connecting portion that is rigidly joined to the attachment portion and that projects away from the attachment portion in a direction that is oblique to the first mounting face, the connecting portion defining at least one fixing element that has a second mounting face, and one or more through-holes that each extend through the respective fixing element in a direction that is generally transverse to the projecting direction of the connecting portion and opens onto the second mounting face,
    whereby the elongate member is fixable to the first mount by locating the planar wall portion of the elongate member adjacent the second mounting face, and passing one or more second fasteners through the through-holes so as to engage the wall portion of the elongate member and thereby secure the elongate member to the first mount; and
a second mount that includes a second mounting point through which a third fastener is to extend to secure the second mount to the other of the building or the non-structural component, the second mount being fixed to, or fixable to one end of the elongate member,
whereby, in use, the assembly is to be installed between the surface and the non-structural component, with the first mount secured by the first fastener to one of the building and the non-structural component, the second mount secured by the third fastener to the other of the non-structural component and the building, and the elongate member extending between the first and second mounts and rigidly fixed thereto.

Preferably, the first mount is configured such that the elongate member is fixable to the first mount in a relative orientation in which the longitudinal direction of the elongate member is non-parallel to the centreline of the connecting portion.

In at least some embodiments, the axis of each through-hole in the respective fixing element of the first mount is substantially parallel to the plane of the first mounting face.

Preferably, the second mounting face of the or each fixing element in the first mount is planar, and is substantially parallel to the normal of the plane of the first mounting face and substantially orthogonal to the axis of each through-hole in the respective fixing element.

In some embodiments, the second mount is releasable fixed or fixable to the elongate member.

In certain embodiments, the second mount further includes:
an attachment portion within which the second mounting point is formed, the attachment portion having a substantially planar first mounting face that in use of the assembly is to be oriented towards one of: the surface or the non-structural component; and
at least one connecting portion that is rigidly joined to the attachment portion and that projects away from the attachment portion in a direction that is oblique to the first mounting face, the connecting portion defining at least one fixing element that has a second mounting face, and one or more through-holes that each extend through the respective fixing element in a direction that is generally transverse to the projecting direction of the connecting portion and opens onto the second mounting face,
whereby the elongate member is fixable to the second mount by locating the planar wall portion of the elongate member adjacent the second mounting face, and passing one or more fourth fasteners through the through-holes and so as to engage the wall portion of the elongate member.

Preferably, the second mount is configured such that the elongate member is fixable to the second mount in a relative orientation in which the longitudinal direction of the elongate member is non-parallel to the centreline of the connecting portion.

In at least some embodiments, the axis of each through-hole in the respective fixing element of the second mount is substantially parallel to the plane of the first mounting face.

Preferably, the second mounting face of the or each fixing element in the second mount is planar, and is substantially parallel to the normal of the plane of the first mounting face and substantially orthogonal to the axis of each through-hole in the respective fixing element.

The connecting portion of the first mount and/or second mount can have two fixing elements that form a pair of tines that define a slot there between, the second mounting face being defined by a surface portion of at least one of the tines, wherein the through-holes are formed in at least one of the tines so as to extend through the respective tine and open onto the slot, and whereby the elongate member is fixable to the respective mount by locating the planar wall portion of the elongate member in the slot.

Preferably, the height of the or each substantially planar wall portion, in a direction that is transverse to the longitudinal direction of the elongate member, is greater than the thickness of the tines of the first and/or second mount, whereby the elongate member is fixable to the respective mount such that the longitudinal direction of the elongate member is non-parallel to the centreline of the connecting portion.

In at least some embodiments, the elongate member has a planar wall portion that extends the entire length of the elongate member between the first and second ends.

The elongate member can be any of a tube section, a channel section, an angle section, and an I-beam section.

Preferably, each tine has an inner portion that is adjacent the base of the slot, and an outer portion that extends from the inner portion to the tip of the respective tine, and wherein the width of each tine within the inner portion increases in a direction that is away from the outer portion.

Alternatively, the connecting portion of the first mount and/or second mount can have a projection that is rigidly joined to the attachment portion, and the at least one fixing element is in the form of a flange that extends from the projection.

The connecting portion can include two flanges that both extend from the projection. Through-holes for second fasteners can be formed in at least one of the flanges.

The connecting portion can have a single flange that extends from the projection. In some embodiments, the mount is configured with the flange positioned such that the wall portion of the elongate member that is adjacent the second mounting face is coincident with a plane that passes through the central axis of the aperture in the attachment portion.

The mounting point of the first and/or second mount can include an aperture that extends through the respective attachment portion, whereby in use of the assembly, the respective first or third fastener is positioned within the aperture.

Alternatively, for the first and/or second mount, the mounting point can include a central fixing formation, and a transverse opening through which to pass a cylindrical portion of the respective first or third fastener, wherein the mounting point is formed at the base of the transverse opening and between the central fixing formation and the mounting face, and wherein the mount is secured to the respective non-structural component or building by securing a portion of the respective first or third fastener against the central fixing formation.

Preferably, the central fixing formation can comprise a C-shaped depression that is shaped to receive part of the respective first or third fastener when that fastener is secured against the central fixing portion, and wherein the C-shaped depression inhibits lateral movement of that part of the respective fastener outwardly with respect to the transverse opening.

In some embodiments, the first and/or second mount is arranged such that the centreline of the connecting portion extends through the mounting point, whereby when the mount is secured by the respective first or third fastener to one of the surface and the non-structural component, and the elongate member is fixed to the connecting portion, tensile loads in the connecting portion that are parallel to the tines of the connecting portion extend through the respective mounting point. Preferably, the centreline of the connecting portion extends through the centroid of the mounting point.

In certain embodiments the attachment portion of the first and/or second mount includes:
an attachment plate that defines the first mounting face, and in which the respective mounting point is formed; and
a pair of arms that extend from the attachment plate to the respective connecting portion,
wherein the arms extend obliquely from the attachment plate.

In certain embodiments, the arms are substantially co-planar with the tines of the connecting portion. Alternatively or additionally, the respective mount has one or more bends formed in the attachment portion intermediate the attachment plate and the arms.

The first and/or second mount can have a plurality of first mounting faces so that the respective mount can be secured to the respective non-structural component or the building in multiple orientations that each have one of the first mounting faces oriented towards the respective non-structural component or the building.

In some embodiments, the first mount has a plurality of connecting portions, wherein each connecting portion is rigidly joined to the attachment portion and projects obliquely to the first mounting face, and
wherein the assembly further comprises a plurality of elongate members that are each fixable to a respective one of the connecting portions of the first mount; and
a plurality of second mounts that are each joined to, or connectable to a respective one of the elongate members.

Preferably, the plurality of connecting portions are arranged such that the centrelines of the connecting portions all extend at a common angle to the first mounting face, and extend partly radially with respect to the mounting point. More preferably, planes that extend through the centrelines of the connecting portions and that are perpendicular to the first mounting face define a line of intersection that extends through the mounting point.

Preferably, for each mount, the attachment portion and the connecting portion (or connecting portions) are formed from a single piece of material.

The assembly can further comprise a resilient element that in use is disposed between the attachment portion of one of the mounts and the respective surface or non-structural component, wherein the resilient member allows longitudinal displacement of the respective mount along the respective fastener.

In one form, the resilient element can include a pad of compressible material. The compressible material may be secured to the mounting face of the attachment portion of the respective mount. In some examples, the compressible material is adhered to the mounting face of the attachment portion of the respective mount. Alternatively or additionally, the resilient element and attachment portion interengage with one another such that the resilient element is retained to the attachment portion of the respective mount. The resilient element can further include a bush that projects from the pad, wherein the bush is configured to locate within the aperture of the respective mount and retain the resilient element to the mount.

Preferably, the compressible material is secured to the mounting face of the attachment portion of the respective mount. In some examples, the compressible material is adhered to the first mounting face of the attachment portion of the respective mount. Alternatively or additionally, the compressible material and attachment portion have complementary interengaging formations, wherein the compressible material engages the attachment portion, and the interengaging formations inhibit disengagement of the compressible material from the attachment portion.

In another form, the resilient element can be a compression spring, and the assembly further comprises a retaining member, wherein the compression spring is installed about the fastener of the respective mount with the first end of the compression spring adjacent the attachment plate, and the retaining member is installed on the respective fastener adjacent the second end of the compression spring such that the compression spring is compressible between the attachment plate and the retaining member.

There is also provided a mount for use in bracing a non-structural building component mounted adjacent a surface of a building, the mount comprising:
  an attachment portion with a mounting point through which a first fastener is to extend to secure the mount to one of: the non-structural component or the building, the attachment portion having a substantially planar mounting face that in use of the mount is to be oriented towards the respective non-structural component or the surface of the building, and
  at least one connecting portion that is rigidly joined to the attachment portion and that projects away from the attachment portion in a direction that is oblique to the first mounting face, the connecting portion defining at least one fixing element that has a second mounting face, and one or more through-holes that each extend through the respective fixing element in a direction that is generally transverse to the projecting direction of the connecting portion and opens onto the second mounting face,
  whereby, in use of the mount, an elongate member is fixable to the mount by locating a wall portion of the elongate member adjacent the second mounting face, and passing one or more second fasteners through the through-holes so as to engage the wall portion of the elongate member and thereby secure the elongate member to the first mount.

Preferably, the mount is configured such that the elongate member is fixable to the mount in a relative orientation in which the longitudinal direction of the elongate member is non-parallel to the centreline of the connecting portion.

In at least some embodiments, the axis of each through-hole in the respective fixing element is substantially parallel to the plane of the first mounting face.

Preferably, the second mounting face of the or each fixing element is planar, and is substantially parallel to the normal of the plane of the first mounting face and substantially orthogonal to the axis of each through-hole in the respective fixing element.

In some embodiments, the connecting portion has two fixing elements that form a pair of tines that define a slot there22between,
  the second mounting face is defined by a surface portion of at least one of the tines, and
  the through-holes are formed in at least one of the tines so as to extend through the respective tine and open onto the slot.

Preferably, each tine has an inner portion that is adjacent to the base of the slot, and an outer portion that extends from the inner portion to the tip of the respective tine, and wherein the width of each tine within the inner portion increases in a direction that is away from the outer portion.

In some alternative embodiments, the connecting portion has a projection that is rigidly joined to the attachment portion, and the at least one fixing element is in the form of a flange that extends from the projection.

The connecting portion can include two flanges that both extend from the projection. Through-holes for second fasteners can be formed in at least one of the flanges.

The connecting portion can have a single flange that extends from the projection. In some embodiments, the mount is configured with the flange positioned such that the wall portion of the elongate member that is adjacent the second mounting face is coincident with a plane that passes through the central axis of the aperture in the attachment portion.

The mounting point can include an aperture that extends through the attachment portion.

Alternatively, the mounting point can include a central fixing formation, and a transverse opening through which to pass a cylindrical portion of the first fastener, wherein the mounting point is formed at the base of the transverse opening between the central fixing formation and the mounting face, and wherein the mount is secured to the respective non-structural component or building by securing a second portion of the first fastener against the central fixing formation.

Preferably, the central fixing formation is on the opposite side of the attachment portion to the mounting face. The central fixing portion can comprise a C-shaped depression that surrounds the base of the transverse opening, and is shaped to receive part of the respective fastener when the fastener is secured against the central fixing portion, the C-shaped depression inhibiting lateral movement of that part of the respective fastener outwardly with respect to the transverse opening.

In some embodiments, the mount is arranged such that the centreline of the connecting portion extends through the mounting point, whereby when the mount is secured by the first fastener to one of the surface and the non-structural component, and an elongate member is fixed to the connecting portion, tensile loads in the connecting portion that are parallel to the tines of the connecting portion extend through the respective mounting point. Preferably, the centreline of the connecting portion extends through the centroid of the mounting point.

In certain embodiments the attachment portion includes:
an attachment plate that defines the mounting face, and in which the mounting point is formed; and
a pair of arms that each extend from the attachment plate to the connecting portion,
wherein the arms extend obliquely from the attachment plate.

Preferably, the arms are substantially co-planar with the tines of the connecting portion. Alternatively or additionally, the mount has one or more bends formed in the attachment portion intermediate the attachment plate and the arms.

In some embodiments, the mount has a plurality of connecting portions, wherein each connecting portion is rigidly joined to the attachment portion and extends obliquely to the mounting face, wherein a plurality of elongate members that each have a wall portion are fixable to a respective one of the connecting portions of the mount.

Preferably, the plurality of connecting portions are arranged such that the centrelines of the connecting portions all extend at a common angle to the mounting face, and extend partly radially with respect to the mounting point. More preferably, planes that extend through the centrelines of the connecting portions and that are perpendicular to the mounting face define a line of intersection that extends through the mounting point.

Preferably, the attachment portion and the connecting portion (or connecting portions) are formed from a single piece of material.

BRIEF DESCRIPTION OF THE DRAWINGS

In order that the invention may be more easily understood, an embodiment will now be described, by way of example only, with reference to the accompanying drawings, in which:

FIG. 9: is a schematic right side view of a mount and elongate member of the assembly of FIG. 1 in a first configuration;

FIG. 10: is a schematic view of the mount and elongate member of FIG. 9, as viewed in the direction indicated by Arrow X in FIG. 9;

FIG. 11: is a plan view of a second of the mounting brackets of the bracing assembly of FIG. 1, the mounting bracket also being in accordance with a third embodiment of the present invention;

FIG. 12: is a right side view of the mounting bracket of FIG. 11;

FIG. 13: is a schematic right side view of the mounting bracket shown in FIG. 5 and the elongate member of the bracing assembly of FIG. 1 in a second configuration;

FIG. 14: is a schematic view of the mount and elongate member of FIG. 13, as viewed in the direction indicated by Arrow XIV in FIG. 13;

FIG. 30: is a top view of the mounting bracket shown in FIG. 28;

FIG. 31: is a cross section view of the mounting bracket shown in FIG. 28, as viewed orthogonally to both the centreline and the central axis;

FIG. 32: is a perspective view of a mounting bracket according to a tenth embodiment of the present invention;

FIG. 33: is a top view of the mounting bracket shown in FIG. 32;

FIG. 34: is a perspective view of a mounting bracket according to an eleventh embodiment of the present invention; and FIG. 35: is a top view of the mounting bracket shown in FIG. 34.

DETAILED DESCRIPTION

Figure 1:
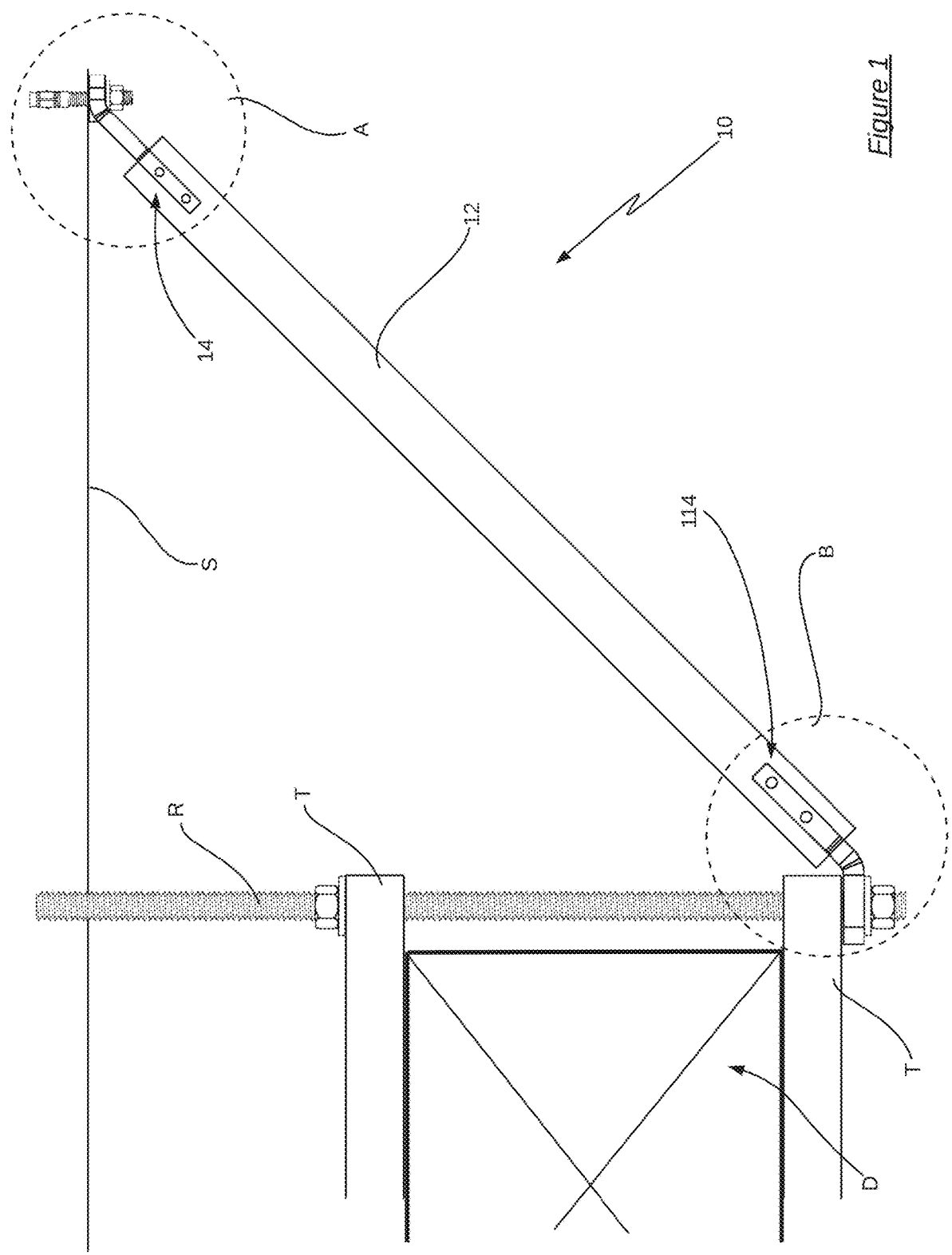
FIG. 1: is a schematic view of a bracing assembly for supporting non-structural building components according to a first embodiment of the present invention.

FIG. 1 shows a bracing assembly 10 for supporting a non-structural building component adjacent a surface of a building, the assembly 10 being in accordance with a first embodiment. In the illustrated example, the non-structural component is a section of duct D of a heating, ventilation and air conditioning (HVAC) system, and the surface of the building is the lower surface of a soffit S of the building.

The duct D is vertically supported beneath the soffit S by a pair of threaded rods R that are embedded within the soffit S, and a pair of trapeze members' T that extend between the threaded rods R. The duct D is secured between the trapeze members T.

The assembly 10 includes a rigid elongate member 12 having first and second ends, and two mounts 14, 114. As shown in further detail in FIG. 2, the outer mount 14 (with respect to the duct D) is secured the soffit S by a fastener 92, which in this example is in the form of a masonry anchor and nut. As shown in further detail in FIG. 3, the inner mount 114 (with respect to the duct D) is secured to one of the trapeze members T by one of the threaded rods R and an internally threaded nut 90; that threaded rod R and nut 90 forming a fastener.

When installed, the assembly 10 extends between the building and the non-structural component (or in the example of FIG. 1, between the soffit S, and the hardware that supports the duct D). As will be apparent from the description and the Figures, the respective connections between the mounts 14, 114 and the soffit S and trapeze member T, and between the mounts 14, 114 and the elongate member 12 are such that a rigid assembly is formed and secured to the building and the non-structural component.

Figure 7:
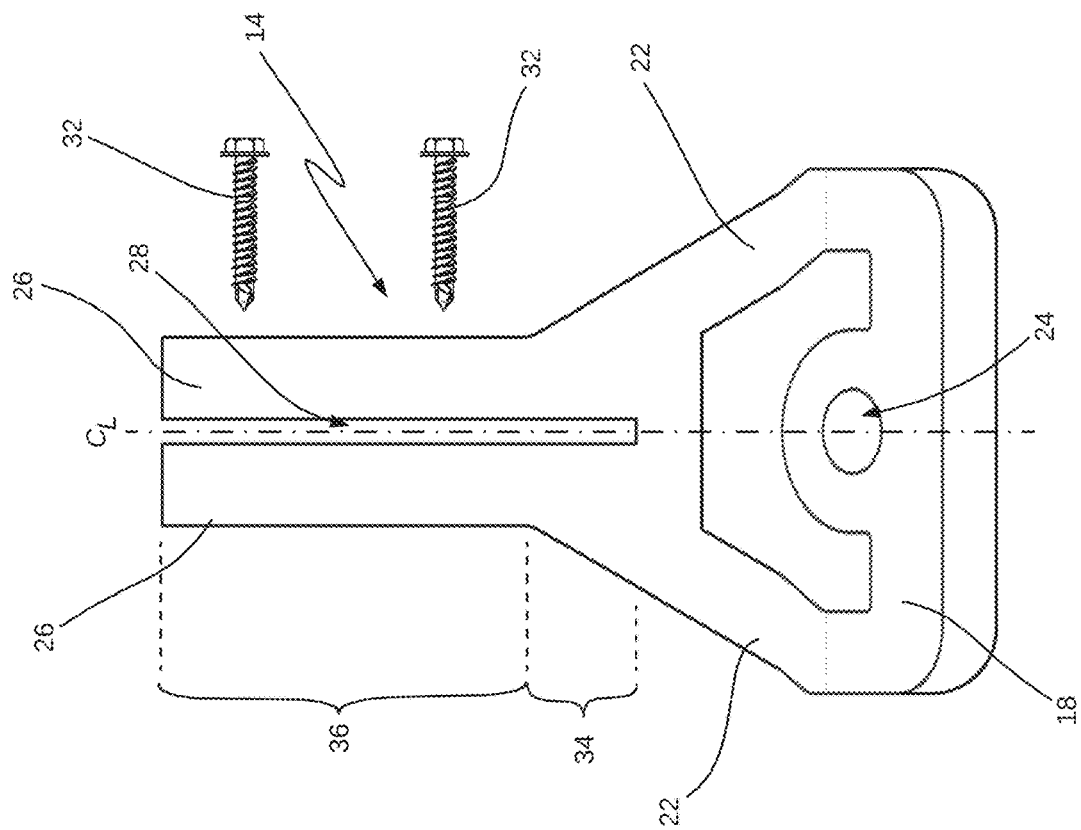
FIG. 7: is a view of the mounting bracket, as viewed in the direction indicated by Arrow VII in FIG. 5.
Figure 8:
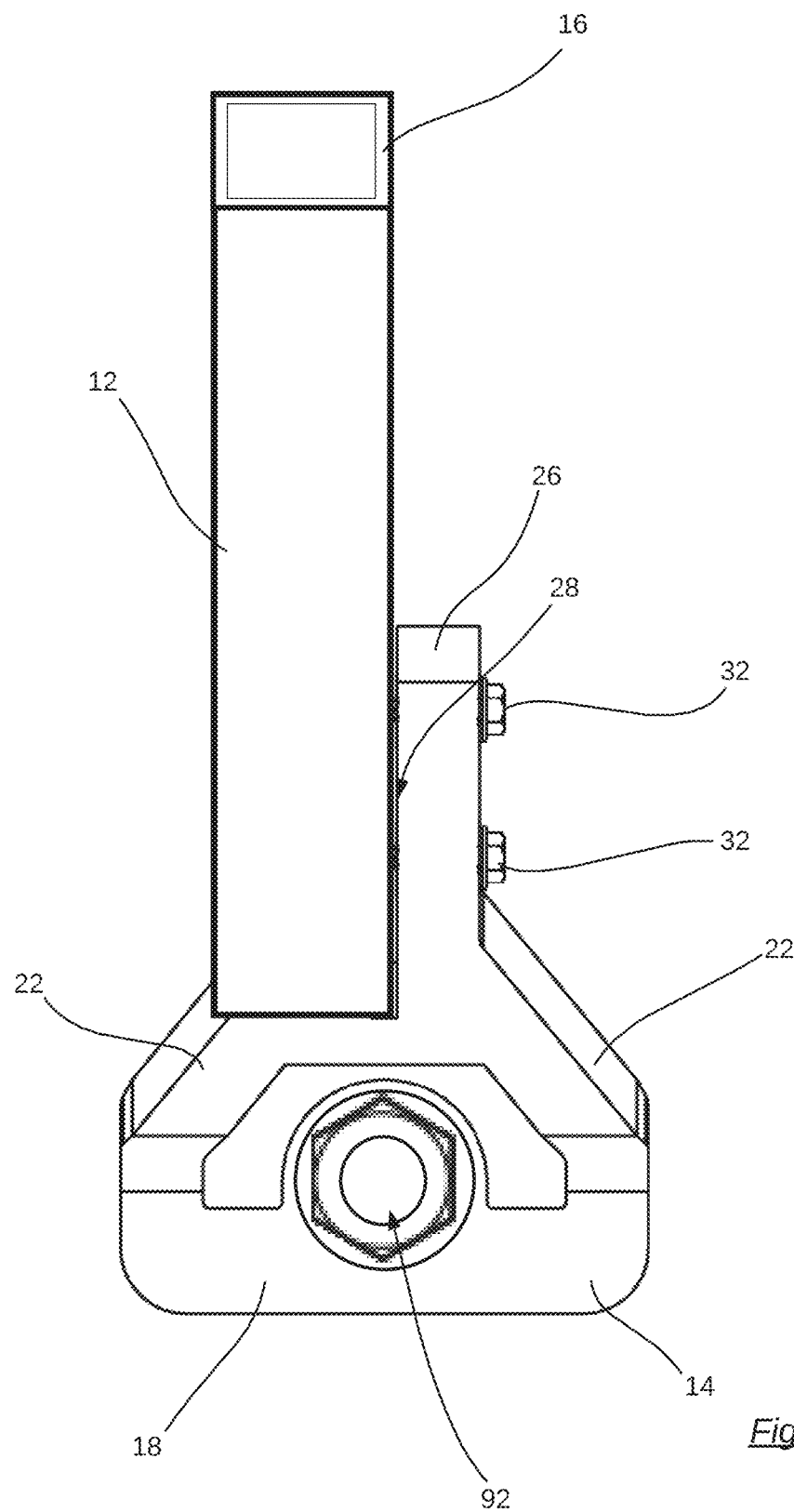
FIG. 8: is a view of Region B of FIG. 1, as viewed in the direction indicated by Arrow VIII in FIG. 3.

FIGS. 4 to 7 show the outer mount 14 in detail. FIGS. 8 to 10 further show the mount 14 together with a portion of the elongate member 12. FIGS. 11 and 12 show the inner mount 114 in detail.

As shown in FIGS. 8 and 10, the elongate member 12 has a substantially planar wall portion 16 that, in this example, extends the full length of the elongate member between the first and second ends. In this example, the elongate member 12 is a hollow square tube, and the wall portion 16 is one of the four walls of that tube.

As shown particularly in FIGS. 4 to 7, the mount 14 has an attachment portion, and a connecting portion that is rigidly joined to the attachment portion. In this particular embodiment, the attachment portion includes an attachment plate 18 that defines a first mounting face 20 of the attachment portion, and a pair of arms 22 that each extend from the attachment plate 18 to the connecting portion. The attachment portion includes a mounting point through which a fastener is to extend to secure the mount. In this particular embodiment, the mounting point is in the form of an aperture 24 that is formed in the attachment plate 18. The connecting portion projects away from the attachment portion in a direction that is oblique to the first mounting face 20.

The mount 114 similarly has an attachment portion, and a connecting portion that is rigidly joined to the attachment portion. In this particular embodiment, the attachment portion includes an attachment plate 118 that defines a first mounting face 120 of the attachment portion. The attachment portion includes a mounting point through which a fastener is to extend to secure the mount 114. In this particular embodiment, the mounting point is in the form of an aperture 124 that is formed in the attachment plate 118. The attachment plate 118 of the mount 114 includes a bend 140 that is between the aperture 124 and the connecting portion. The connecting portion of the mount 114 also projects away from the attachment portion in a direction that is oblique to the first mounting face 120.

Figure 2:
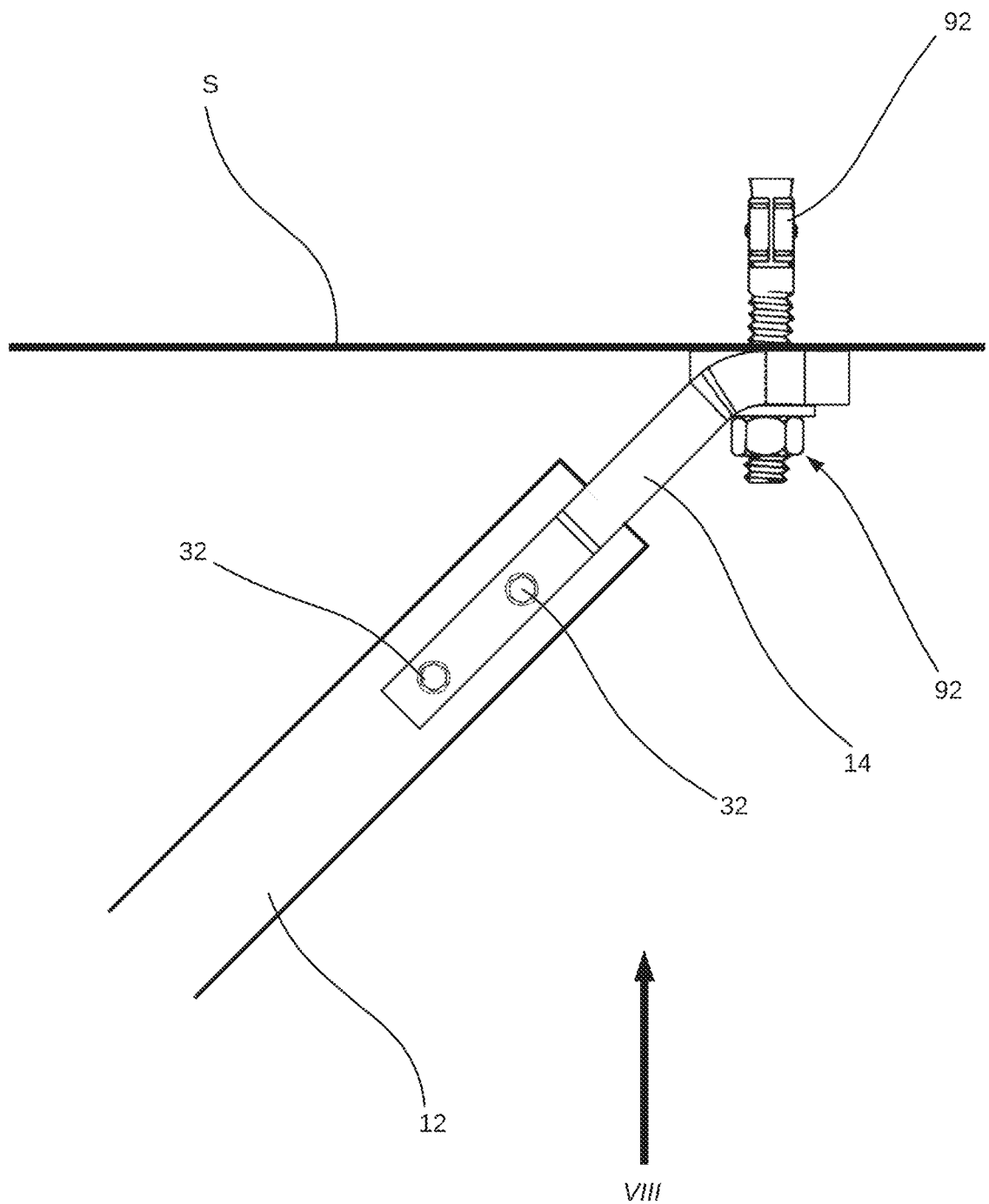
FIG. 2: is an enlarged view of Region A in FIG. 1.
Figure 3:
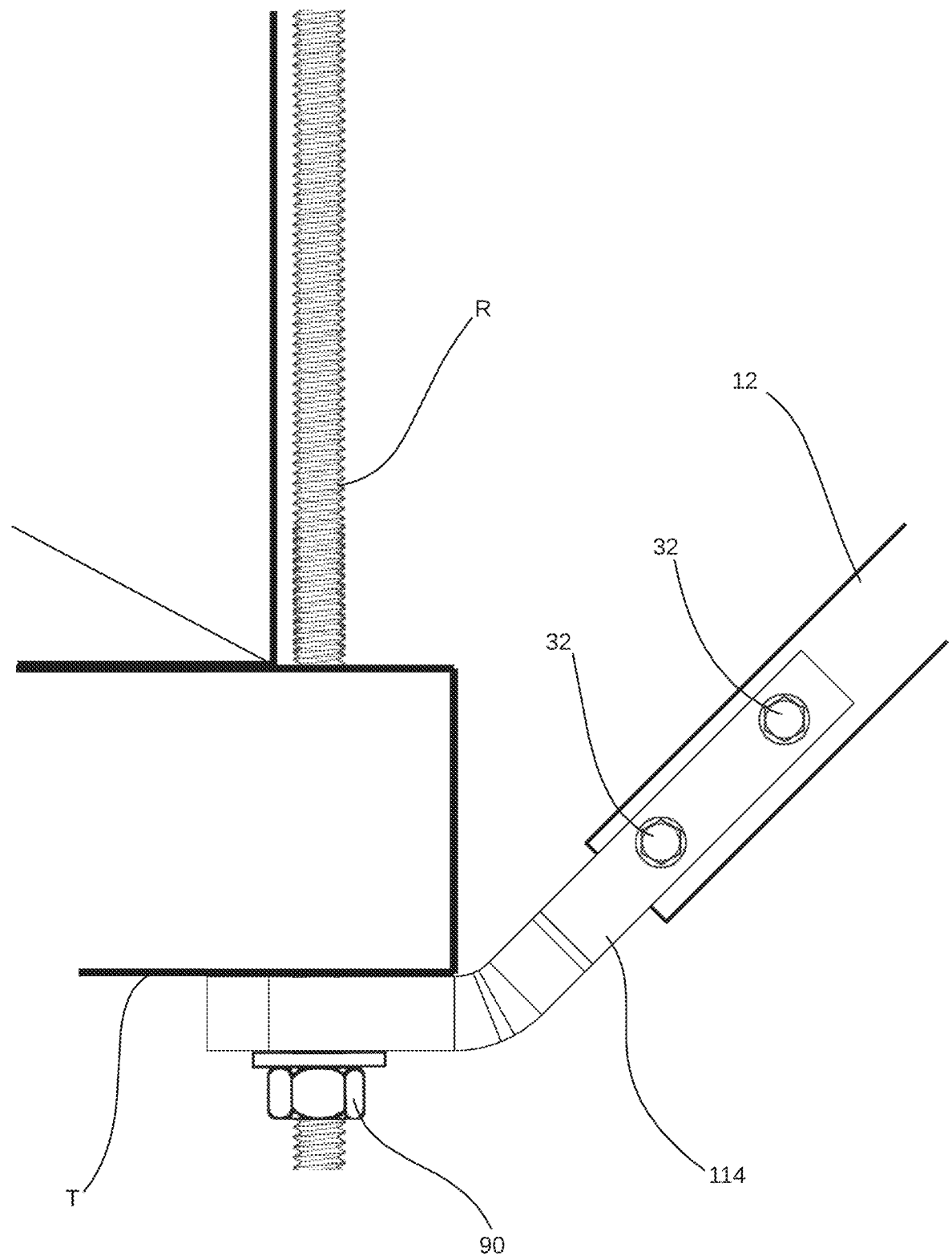
FIG. 3: is an enlarged view of Region B in FIG. 1.

As will be evident from FIGS. 2 and 3, in the installed assembly 10, the mounting face 20 of the outer mount 14 is oriented towards the building (in other words, the ceiling surface of the soffit S, in the example of FIG. 1). Further, the underside of the inner mount 114 is oriented towards the non-structural component (in other words, the duct D, in the example of FIG. 1).

As shown in FIG. 12, the mount 114 has a secondary mounting face 120' that is on the opposite side of the attachment plate 118 to first mounting face 120. When appropriate, the mount 114 can be secured to a non-structural component with the second mounting face 120' oriented towards the non-structural component.

The connecting portion of the mount 14 defines fixing elements that each have a second mounting face. In this particular embodiment, the connecting portion has two fixing elements in the form a pair of tines 26 that define a slot 28 there between. The second mounting faces of the mount 14 are defined by surface portions of the tines 26 that are oriented inwardly into the slot 28.

Figures 4, 5:
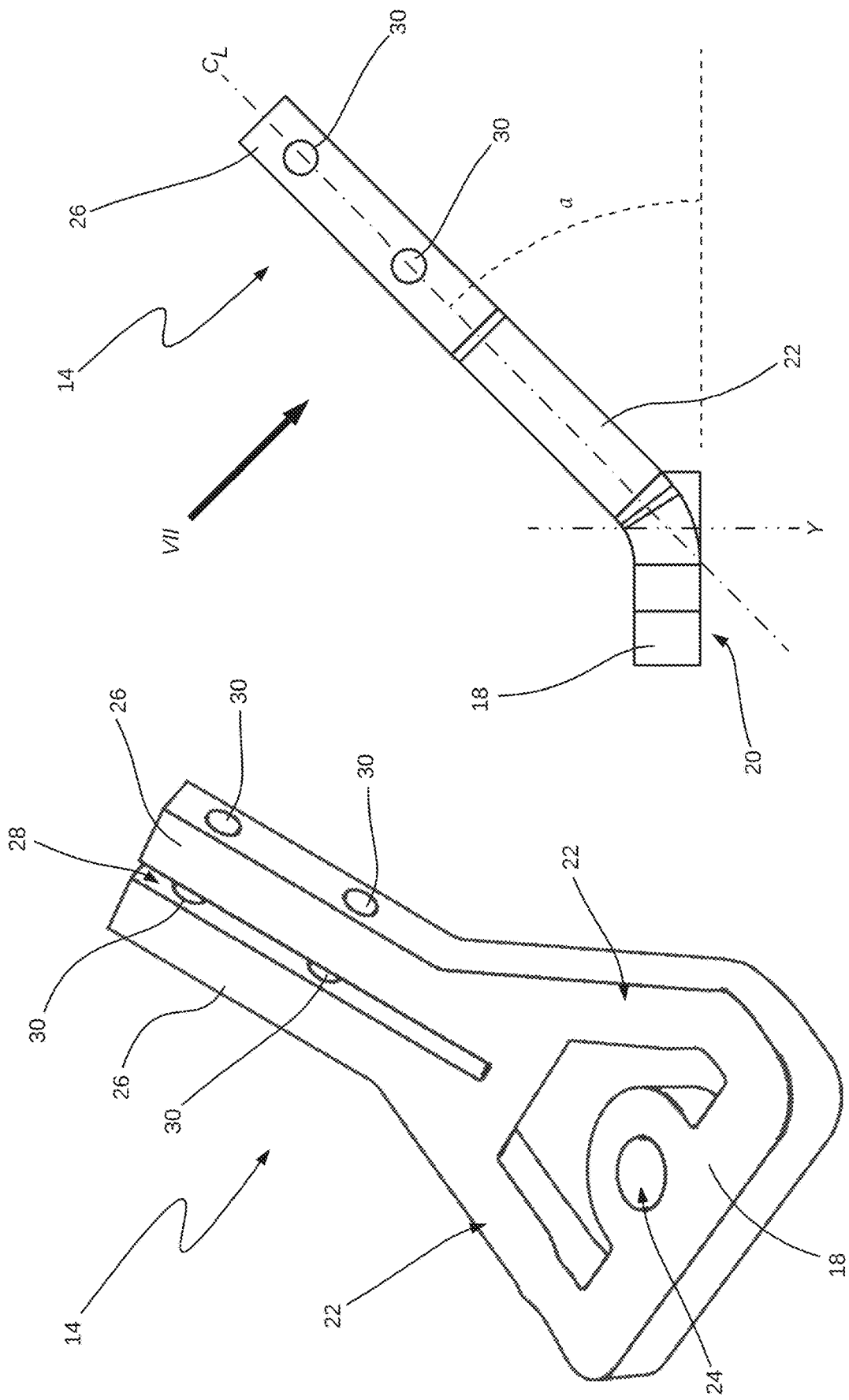
FIG. 4: is a perspective view of one of the mounting brackets of the bracing assembly of FIG. 1, the mounting bracket also being in accordance with a second embodiment of the present invention.
FIG. 5: is a right side view of the mounting bracket shown in FIG. 4.

As will be apparent from FIGS. 4 and 5, the two tines 26 also project away from the arms 22 of attachment portion in a direction that is oblique to the first mounting face 20. Each of the tines 26 has through-holes 30 that extend through the respective tine 26 and open onto the slot 28. In this way, the through-holes 30 open onto the second mounting faces of the mount 14. Further, the through-holes 30 are generally transverse to the projecting direction of the connecting portion.

In this embodiment, each tine 26 has a through-hole 30 that is axially aligned with a through-hole 30 in the other tine 26 to form an axially aligned pair. As shown in FIGS. 4 and 5, each tine 26 has more than one through-hole 30; in this example, two through-holes 30 that form two axially aligned pairs.

The axes of the through-holes 30 in the tines 26 are substantially parallel to the plane of the first mounting face 20.

As will be apparent from FIGS. 4 to 10, the second mounting faces of the tines 26 are planar. Further, the second mounting faces are substantially parallel to the normal of the plane of the first mounting face 20, and also substantially orthogonal to the axes of the through-holes 30.

Similarly, the connecting portion of the mount 114 defines fixing elements that each have a second mounting face. In this particular embodiment, the connecting portion has two fixing elements in the form a pair of tines 126 that define a slot 128 there between. The second mounting faces of the mount 114 are defined by surface portions of the tines 126 that are oriented inwardly into the slot 128.

As will be apparent from FIGS. 11 and 12, the two tines 126 that project away from the attachment plate 118 in a direction that is oblique to the first mounting face 120. Each of the tines 126 has through-holes 130 that extend through the respective tine 126 and open onto the slot 128. The through-holes 130 in the tines 126 are also aligned to form an axially aligned pairs.

The width of the slots 28, 128 enables a part of the wall portion 16 of the elongate member 12 that is at one of the ends to be located between tines 26, 126. In the assembly 10, the elongate member 12 is fixed to each mount 14, 114 by locating the wall portion 16 of the elongate member 12 in the slots 28, 128, and passing a second fasteners 32 through the through-hole 30, 130 in one of the tines 26, 126 and into the wall portion 16 of the elongate member 12. As the through-holes 30, 130 are in axially aligned pairs, each second fastener 32 can be placed through the wall portion 16 and through the both through-holes 30, 130 in the axially aligned pair.

In this embodiment, the fasteners 32 are self-drilling screws that have a shank length that is approximately the same as the external width of the tines 26, 126. Thus, the fasteners 32 can engage with both tines 26, 126 (in the respective mount 14, 114) and the wall portion 16, which places each fastener 32 in double-shear. Further, each fastener 32 forms a hole through the wall portion 16 during installation. In this way, the elongate member 12 is rigidly fixed to each of the mounts 14, 114.

The provision of two pairs of axially aligned through-holes 30, 130 and the use of two second fasteners 32 enables a rigid connection to be formed between the mounts 14, 114 and elongate member 12.

Each tine 26, 126 has an inner portion 34, 134 that is adjacent the base of the slot 28, 128, and an outer portion 36, 136 that extends from the inner portion 34, 134 to the tip of the respective tine 26, 126. As shown in FIG. 7, the width of each tine 26 within the inner portion 34 increases in a direction that is away from the outer portion 36. The increasing width of the tines 26, 126 within the inner portions 34, 134 has the benefit of increasing the rigidity of the tine 26, 126. Particularly in the case of an elongate member 12 that has a square tube profile (as shown in FIGS. 8 and 10) there is minimal interference of the increased width with the ability to position the end of the elongate member 12 at the base of the slot 28, 128. Rigidity of the overall assembly 10 is benefited by locating the ends of the elongate member 12 at the base of the slot 28, 128 to minimize bending loads on the tines 26, 126.

Figure 6:
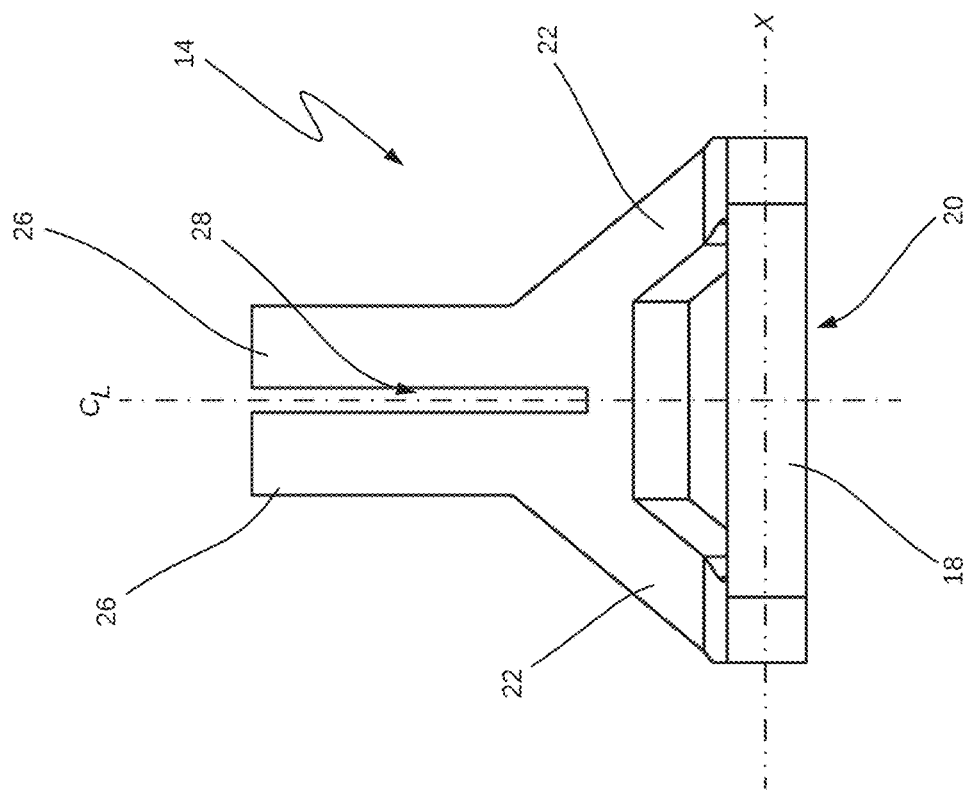
FIG. 6: is a front view of the mounting bracket shown in FIG. 4.

In FIGS. 5 to 7, the dash-dot lines indicate the location of the centreline $C_L$ of the connecting portion of the mount 14. Further, in FIG. 5 the dash-dot-dot line indicates the central axis Y of the aperture 24. As will be evident from FIG. 5, in this particular embodiment, the centreline $C_L$ of the connecting portion extends through the aperture 24. Thus, when the mount 14 is secured by a fastener (such as fastener 92) to one of the surface and the non-structural component, and an elongate member 12 is fixed to the connecting portion, tensile loads that are parallel to the tines 26 extend through the aperture 24. As will be appreciated, this structural arrangement provides the benefit of limiting torque on the attachment plate 18 (in response to such tensile loads) that can then create leverage against the fastener retaining the mount 14 to the building/non-structural component.

In FIG. 6, the transverse position of the point of intersection between the centreline $C_L$ of the connecting portion and the central axis Y of the aperture 24 is indicated by the dash-dot-dot line X As will be apparent from both FIGS. 5 and 6, the centreline $C_L$ of the connecting portion extends through the centroid of the aperture 24.

FIG. 5 also indicates the angle □ between the underside surface (which is the first mounting face 20) and the centreline $C_L$ of the connecting portion of the mount 14.

As is also evident from FIG. 7, the arms 22 of the attachment portion are contiguous with the inner portion 34 of the tines 26. Further, the attachment plate 18 is contiguous with the arms 22. As will be evident from FIGS. 4 to 7, the attachment portion and the connecting portion of the mount are formed from a single piece of material. Thus, the rigidity of the assembly 10 extends between the mounting points of the two mounts 14.

As shown in FIG. 10, the height of the wall portion 16 of the elongate member 12 (in a direction that is transverse to the longitudinal direction of the elongate member 12), is greater than the thickness of the tines 26 of the mount 14. In FIG. 10, the height of the wall portion 16 is indicated by arrows h-h, and the thickness of the tines 26 is indicated by arrows t-t. Similarly, with respect to the thickness of the tines 126 of the mount 114.

In this example, the height h-h of the wall portion 16 is defined by the separation of the two opposing walls of the elongate member 12 that each share a vertex with the wall portion 16. As will be appreciated from FIGS. 9 to 12, the difference in wall height h-h and tine thickness t-t facilitates the elongate member 12 being able to be fixed to the mount 14 such that the longitudinal direction of the elongate member 12 (indicated by broken line Z in FIG. 11) is non-parallel to the centreline $C_L$ of the connecting portion. This has the significant benefit of enabling the assembly 10 to accommodate a range of positions in which the connecting portion of the mount 14 and the longitudinal direction of the elongate member 12 are oblique to one another, whilst the installed assembly 10 does not have any movable components. As will be appreciated, the maximum angular difference between the centreline of the connecting portion of the mount 14 and the longitudinal direction of the elongate member 12 is dependent on several factors, including the difference between the wall height and the tine thickness, the overall length of the slot 28, and the extent to which the elongate member 12 is inserted into the slot 28. It will be appreciated that these comments apply similarly in respect of the mount 114.

In some instances, it may be desirable to fix the elongate member 12 to one or both mounts 14, 114 using, for each mount, a single second fastener 32 and one of the pairs of through-holes 30, 130. For each connection between the elongate member 12 and the respective mount 14, 114, tension in the second fastener 32 has the effect of "clamping" the wall portion 16 between the tines 26, 126. Friction between the elongate member 12 and the respective mount 14, 114 provides rigidity in the assembly 10. This arrangement has the benefit of enabling the relative angles between the respective centreline $C_L$ and the longitudinal direction Z of the elongate member 12 to be adjusted and/or reset.

FIG. 1 shows a single bracing assembly 10 that extends outwardly with respect to the duct D. It will be appreciated that, in practice, multiple bracing assemblies 10 are likely to be used to brace a non-structural building component. For instance, two bracing assemblies can be used to provide rigid bracing in both directions and in a common plane. Two bracing assemblies can be used to provide rigid bracing in two separate planes. In some instances, it may be desirable or necessary for one or more bracing assemblies to extend inwardly with respect to the non-structural building component. With reference to FIG. 1, the bracing assembly would extend from the duct D upwardly and to the left.

In the examples of the mounts 14, 114 shown in FIGS. 1 to 14, it will be apparent that the second fasteners 32 extend into the through-holes 30, 130 of both tines 26, 126. While it is described above that the threads of the second fasteners 32 engage with both the tines in the respective mount 14, 114, it will be appreciated that this may not be required. To this end, the through-holes 30, 130 in one or both tines 26, 126 of the respective fastener may have a diameter that is equal to, or greater than the thread diameter of the second fasteners 32. Hence, the second fasteners 32 are retained in position by engagement with the elongate member 12, and/or one of the two tines of the mount 14, 114.

In an alternative arrangement, the threads of secondary fasteners 32 can engage with a first of tines in the pair, and the tip of the respective secondary fastener 32 can bear against the elongate member 12 (such that the shank of the fastener does not extend through the wall portion 16 of the elongate member 12). In this way, the wall portion 16 of the elongate member 12 is effectively clamped between the secondary fastener(s) 32 and the second of the tines in the pair.

Figure 15:
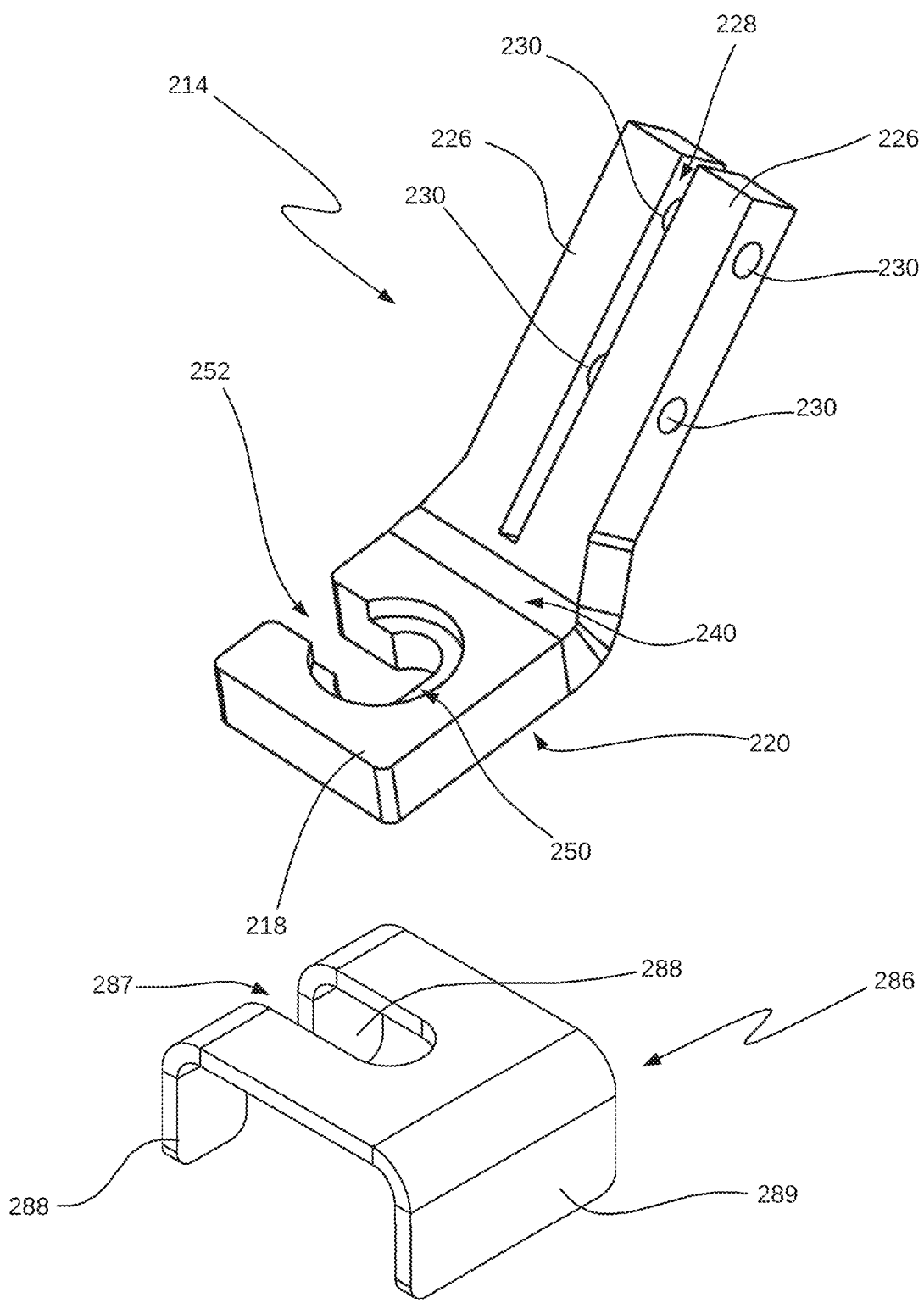
FIG. 15: is a perspective view of a mounting bracket according to a fourth embodiment of the present invention, together with a retrofit table washer.
Figure 17:
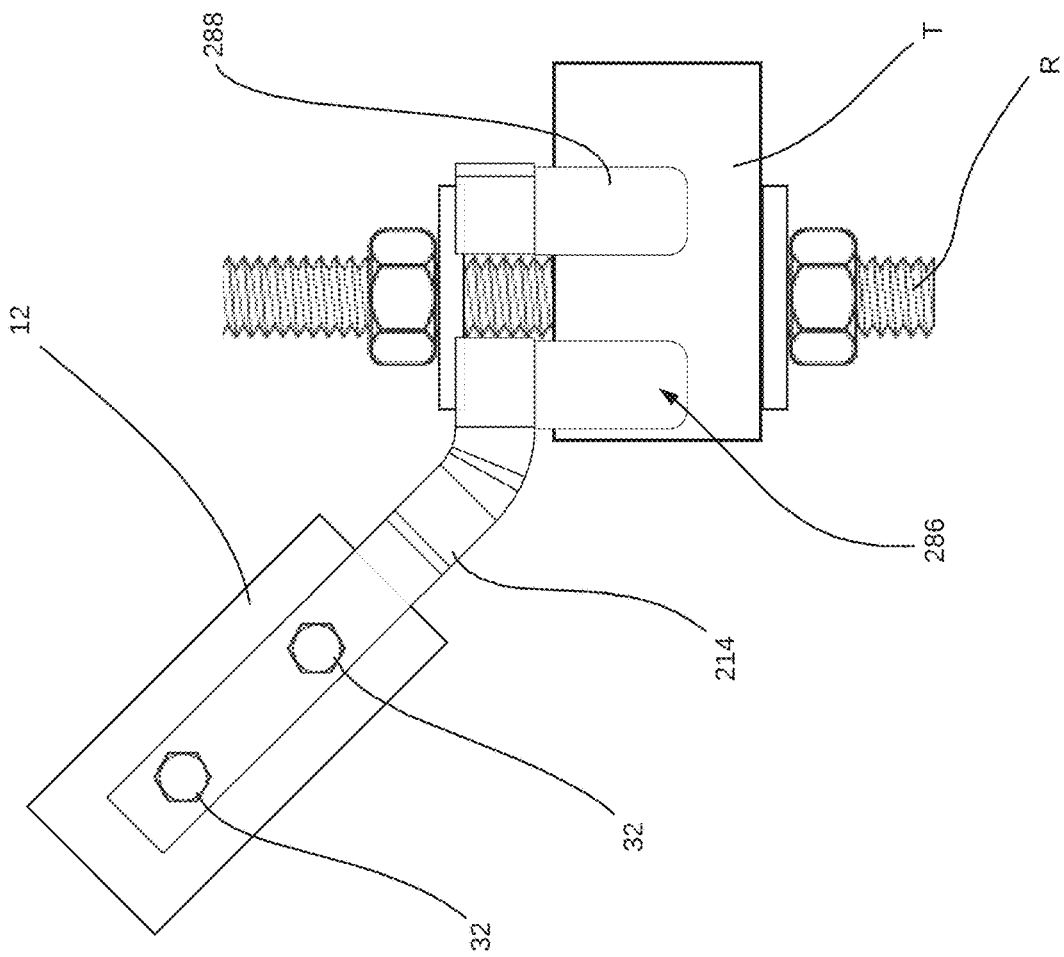
FIG. 17: is a partial schematic view of a bracing assembly for supporting non-structural building components, the assembly incorporating the mounting bracket and retrofit table washer shown in FIG. 15.
Figure 16:
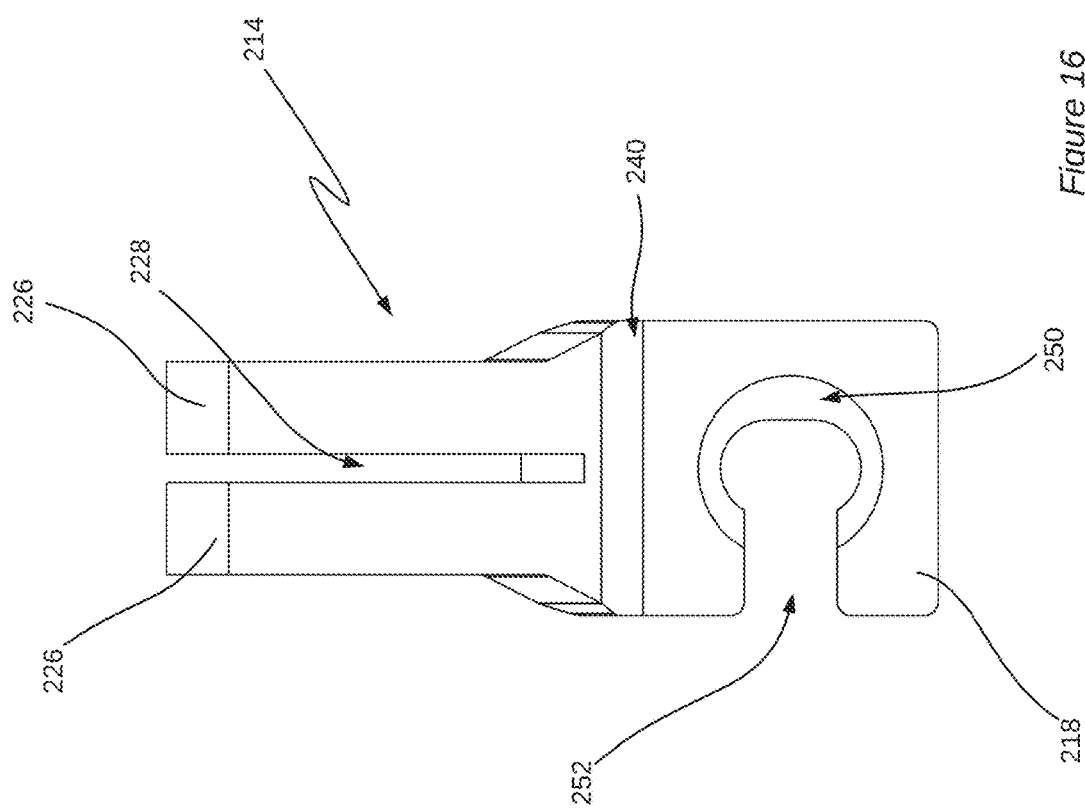
FIG. 16: is a top view of the mounting bracket of FIG. 15.

FIGS. 15 and 16 show a mount 214 for use in bracing a non-structural building component mounted adjacent a surface of a building, the mount 214 being in accordance with a fourth embodiment. The mount 214 is substantially similar to the mount 114 shown in FIGS. 13 and 14, and like components of the mount 214 have the same reference numeral with the prefix "2" replacing the prefix "1". FIG. 15 also shows a washer 286 that can be retro-fitted onto a previously installed section of threaded rod. FIG. 17 shows the mount 214 together with the washer 286, a portion of the elongate member 12, and a trapeze member T supported by a threaded rod R.

The principal difference between the mount 214 and the mount 114 is in the mounting point within the attachment portion. To this end, the mount 214 includes a central fixing formation 250, and a transverse opening 252. The mounting point of the attachment portion is formed at the base of the transverse opening 252, between the central fixing formation 250 and the underside 220.

In use, the mount 214 is secured to a fastener, such as a threaded rod, involves:
- aligning the mount 214 with the mounting face 220 being perpendicular to the longitudinal axis of a cylindrical portion of the fastener (such as the threaded rod itself);
- passing the cylindrical portion of the fastener into the transverse opening 252, preferably to be against the base of the slot; and
- securing one or more other portions of the fastener (such as a nut, or a washer and nut pair) against the central fixing formation 250.

In this particular embodiment, the central fixing formation 250 is a C-shaped depression that is on the opposite side of the attachment portion to the mounting face 220, and surrounds the base of the transverse opening 252. The C-shaped depression is shaped to receive the other portion(s) of the fastener when the fastener is secured against the central fixing portion 250. Consequently, the C-shaped depression inhibits lateral movement of those portion(s) of the respective fastener outwardly with respect to the transverse opening 252. In this way, the fastener and mount 214 are effectively prevented from separating.

The structure of the mounting point of the mount 214 has the benefit of enabling the mount 214 (and thus a bracing assembly that incorporates that mount 214) to be retro-fitted to a pre-installed fastener that does not have ready access to enable a mount with an aperture in the attachment portion (such as either mount 14 or mount 114) to be secured to that fastener.

The washer 286 has a transverse slot 287 that enables the washer 286 to be located about the threaded rod R, as shown in FIG. 17. A pair of legs 288 depend from the body portion of the washer 286 to locate against the trapeze member T. The legs 288 are adjacent the transverse slot 287.

In this particular embodiment, the washer 286 also has a wing 289 that depends from the body portion of the washer 286. As shown in FIG. 7, the wing 289 is on an opposing side of the body portion of the washer 286 to the legs 288. As will be appreciated, this enables the washer 286 to straddle the trapeze member T, when installed.

Figure 18:
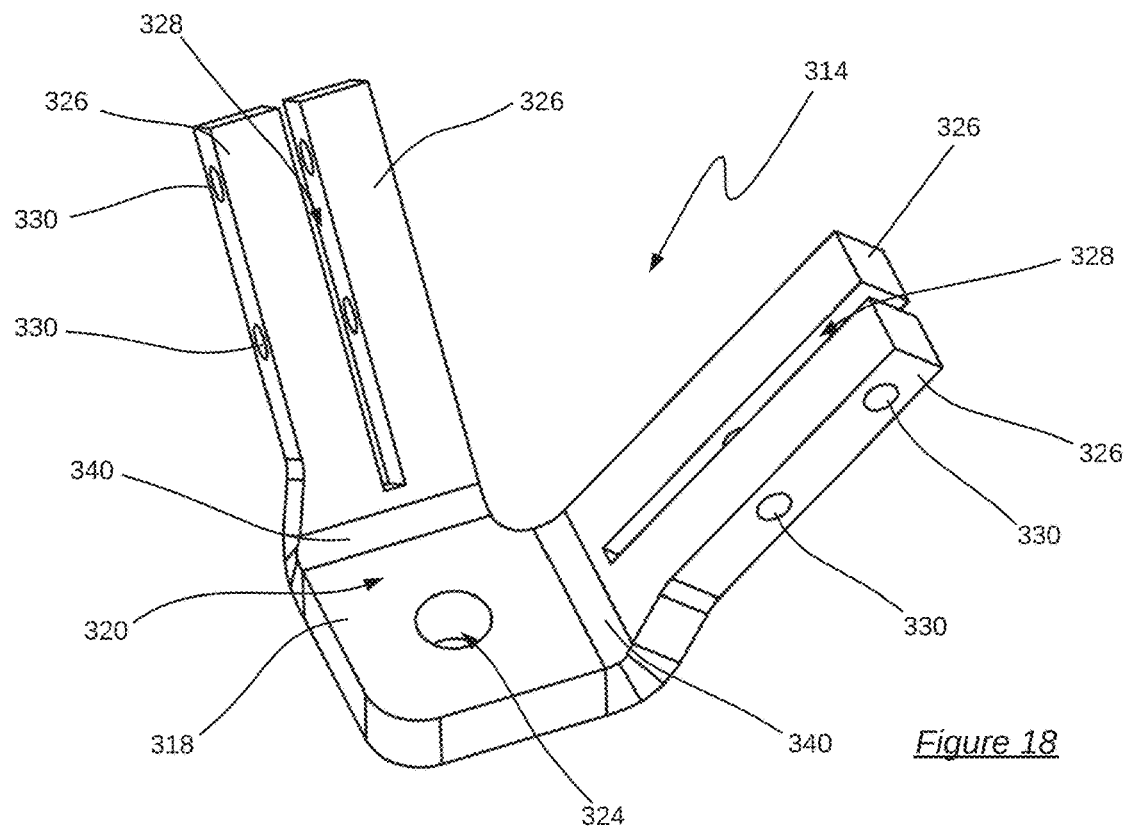
FIG. 18: is a perspective view of a mounting bracket according to a fifth embodiment of the present invention.

FIG. 18 shows a mount 314 for use in bracing a non-structural building component mounted adjacent a surface of a building, the mount 314 being in accordance with a fifth embodiment. The mount 314 is substantially similar to the mount 114 shown in FIGS. 13 and 14, and like components of the mount 314 have the same reference numeral with the prefix "3" replacing the prefix "1".

The principal difference between the mount 314 and the mount 114 is that the mount 314 has two connecting portions that are each rigidly joined to the attachment portion, and each extend obliquely to the first mounting face 320. Two elongate members, each having a planar wall portion, are fixable to a respective one of the connecting portions of the mount 314. Each connecting portion includes two tines 326 that define a slot 328. Thus, each connecting portion has a substantially similar construction to the connecting portion of the mount 114.

The centrelines of the two connecting portions extend at a common angle to the first mounting face 320. Further, each connecting portion extends partly radially with respect to the aperture 324. The notional planes that extend through the centreline of a respective connecting portion and that are perpendicular to the first mounting face 320 define a line of intersection that extends through the aperture 324. In this particular embodiment, these two planes are oriented at 90° to one another.

Figure 19:
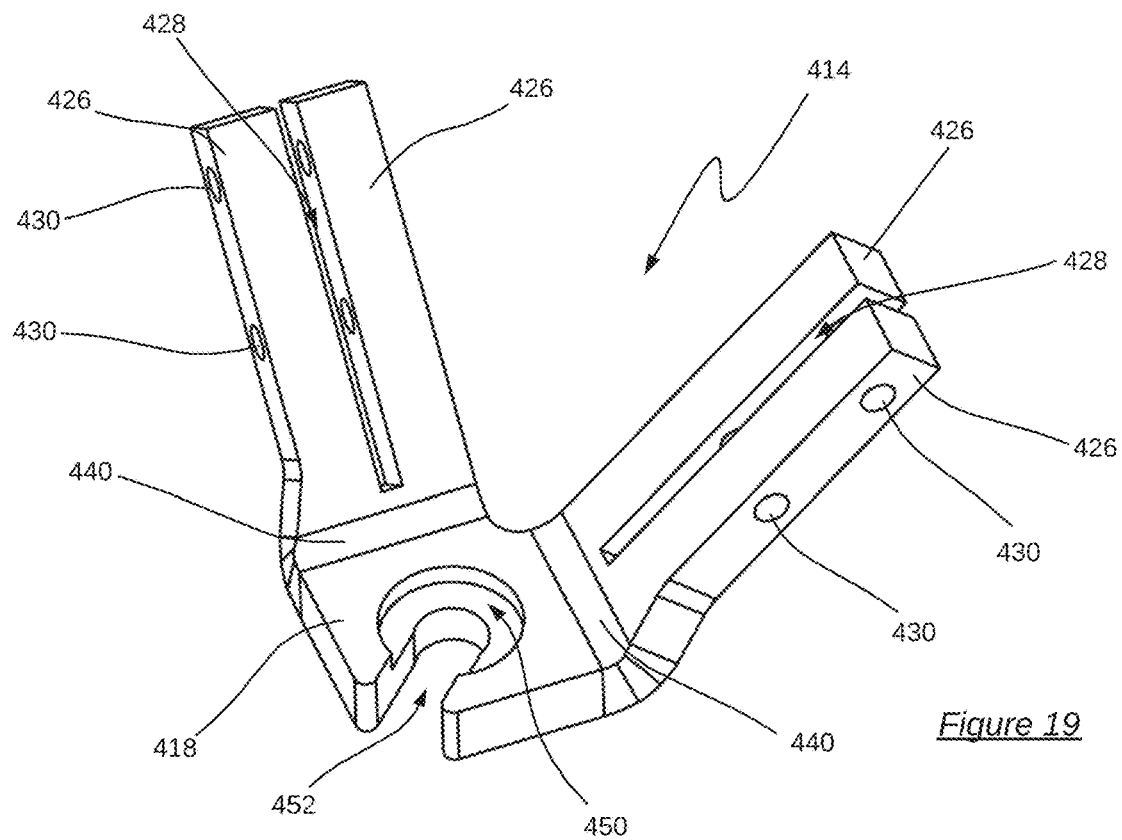
FIG. 19: is a perspective view of a mounting bracket according to a sixth embodiment of the present invention.

FIG. 19 shows a mount 414 for use in bracing a non-structural building component mounted adjacent a surface of a building, the mount 414 being in accordance with a sixth embodiment. The mount 414 has features that are substantially similar to features of the mount 314 shown in FIG. 18, and also features that are substantially similar to features of the mount 214. Accordingly, like components of the mount 414 have the same reference numeral with the prefix "4" replacing the either prefix "2" or "3", as appropriate.

As will be appreciated from FIG. 19, the mount 414 has two connecting portions arranged with notional planes at 90° to one another. Thus, two elongate members, each having a planar wall portion, are fixable to the mount 414.

The attachment portion of the mount 414 has a central fixing formation 450, and a transverse opening 452, each of which is similar to the central fixing formation 250 and transverse opening 252 of the mount 214. The mount 414 is secured to a fastener in a manner similar to that described previously in reference to the embodiment shown in FIGS. 15 and 16.

Figure 20:
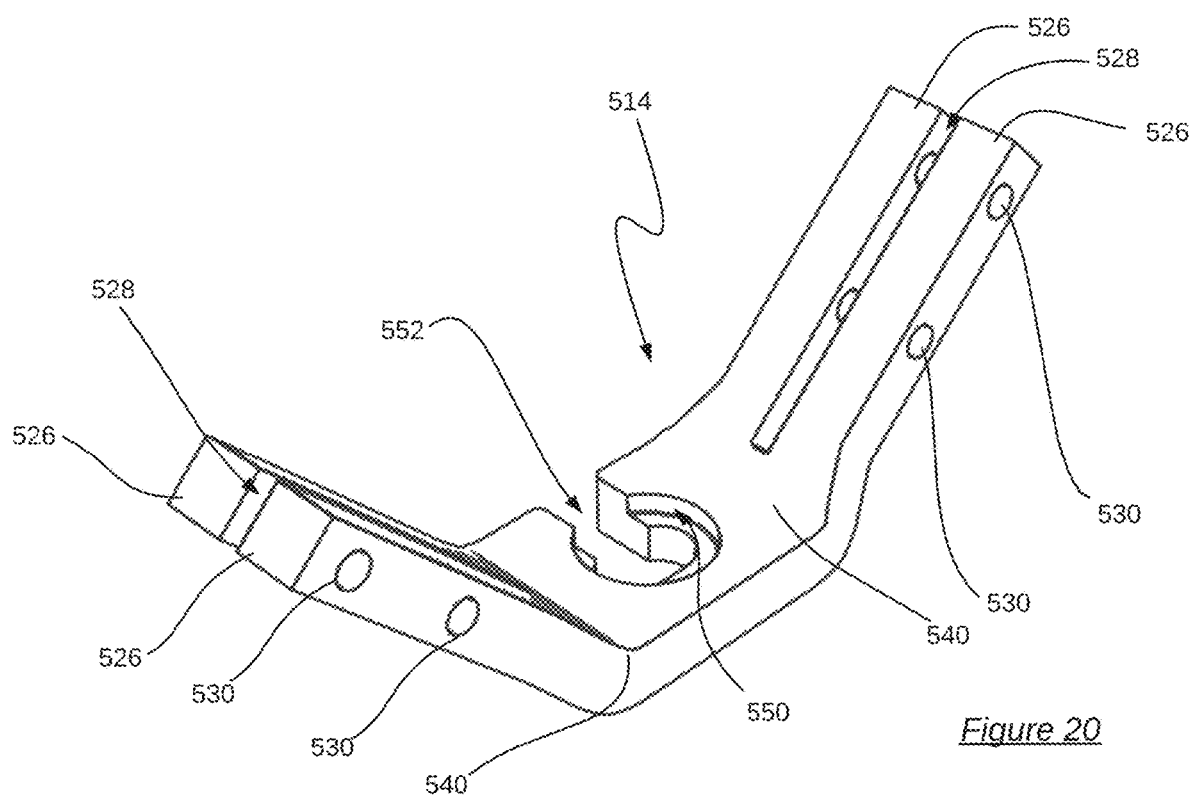
FIG. 20: is a perspective view of a mounting bracket according to a seventh embodiment of the present invention.

FIG. 20 shows a mount 514 for use in bracing a non-structural building component mounted adjacent a surface of a building, the mount 514 being in accordance with a seventh embodiment. The mount 514 is substantially similar to the mount 414 shown in FIG. 19, and like components of the mount 514 have the same reference numeral with the prefix "5" replacing the prefix "4".

The principal difference between the mount 514 and the mount 414 is that the two connecting portions of the mount 514 are arranged with notional planes at 180° to one another.

Figure 21:
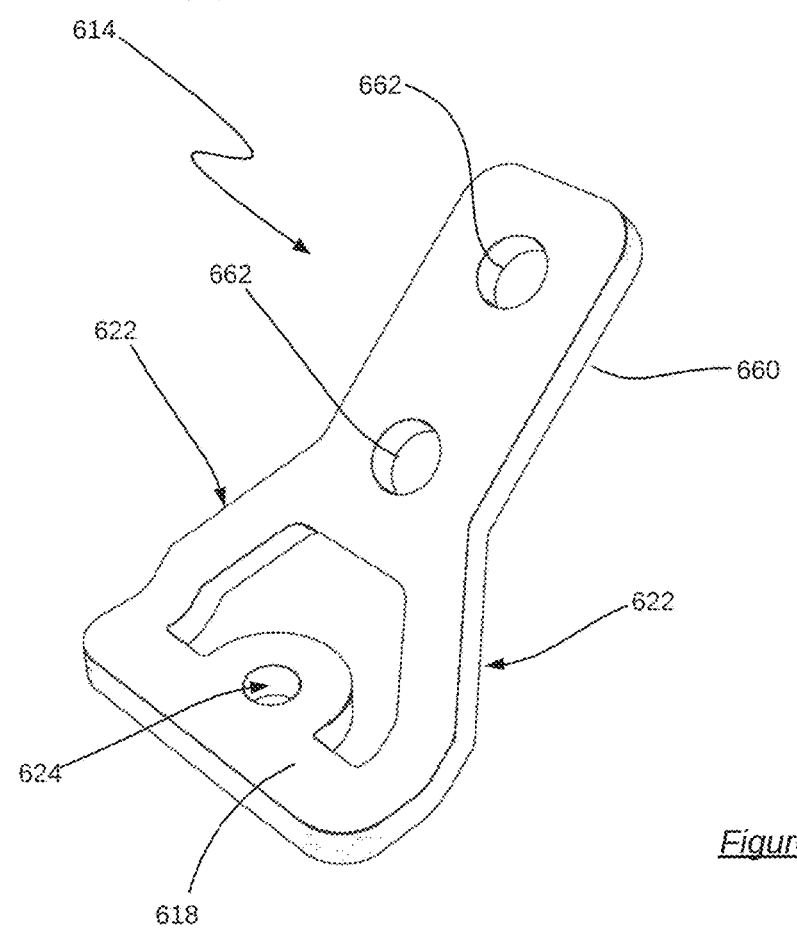
FIG. 21: is a perspective view of a mounting bracket according to an eighth embodiment of the present invention.

FIG. 21 shows a mount 614 for use in an assembly for bracing a non-structural building component mounted adjacent a surface of a building, the mount 614 being in accordance with an eighth embodiment. The mount 614 can be used in conjunction an assembly for supporting a non-structural building component adjacent a surface of a building; For example, the assembly 10 of FIG. 1, in which the mount 614 replaces one of the mounts 14.

As will be appreciated from FIG. 21, the mount 614 differs from the mount 14 in that the connecting portion has a single tongue 660 with mounting holes 662. The elongate member of the assembly is secured to the tongue 660 in abutment with either major surface of the tongue 660.

Figure 22:
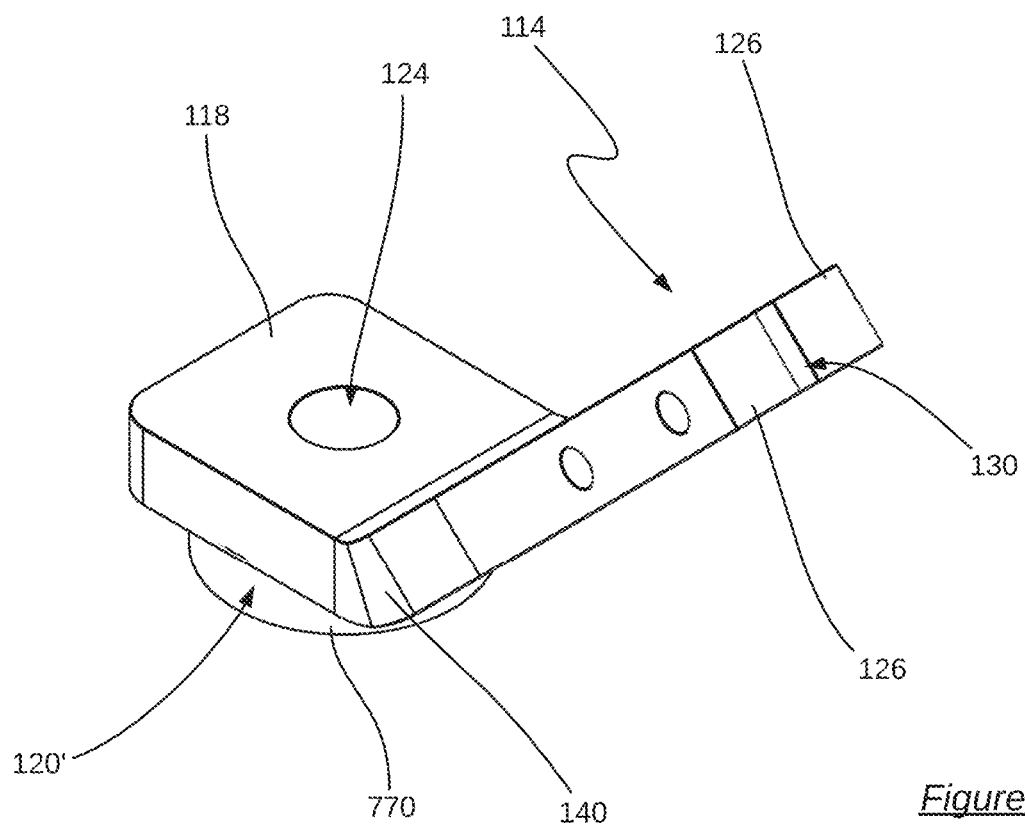
FIG. 22: is a perspective view of the mounting bracket of FIG. 11, together with a first resilient member.
Figure 23:
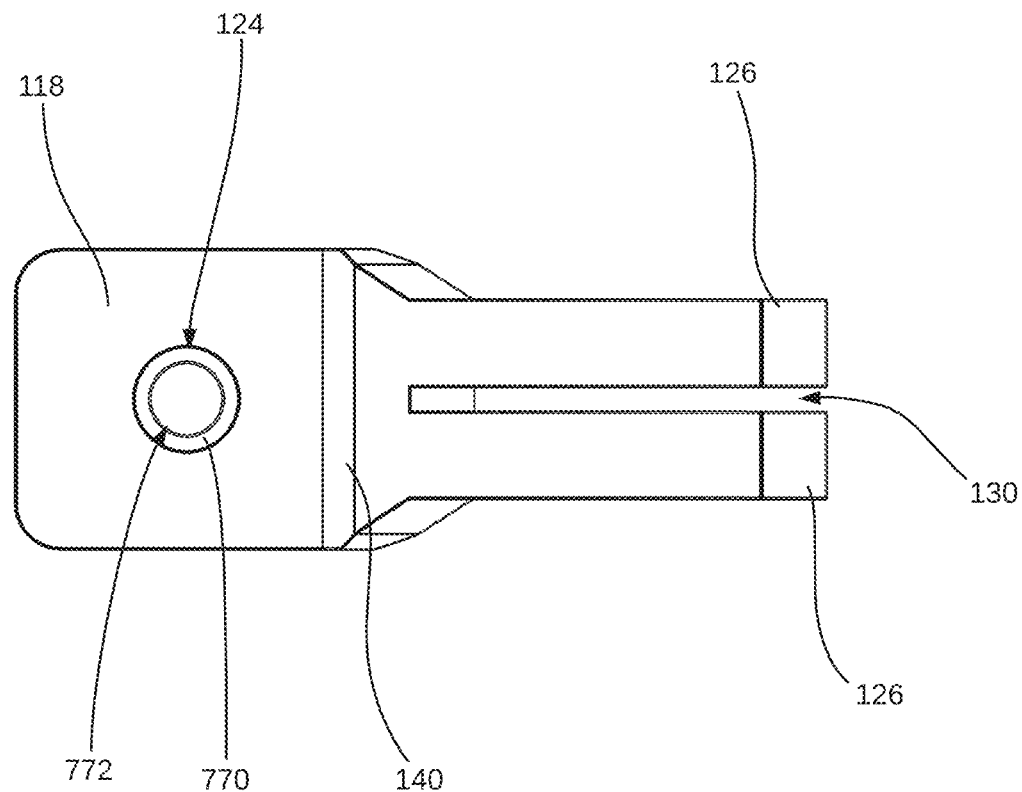
FIG. 23: is a top view of the mounting bracket and first resilient element of FIG. 22.

FIGS. 22 and 23 show the mount 114 of FIG. 11, together with a resilient element that can be included in a bracing assembly according to an embodiment of the present invention.

In FIGS. 22 and 23, the resilient element is in the form of a pad 770 made of compressible material. When the mount 114 is installed in the bracing assembly, the pad 770 is positioned between the attachment portion of the mount 114 and the respective surface or non-structural component. In the arrangement illustrated in FIGS. 22 and 23, the pad 770 is to be positioned between the secondary mounting face 120', and the respective surface or non-structural component.

As shown in FIG. 22, the resilient element includes a through-hole 772 that extends through the pad 770, and is to align with the aperture 124 of the mount 114. In this particular embodiment, the through-hole 772 has a smaller diameter than the aperture 124 of the mount 114. The respective fastener is to extend through both the aperture 124 and the through-hole 772.

When a bracing assembly incorporating the pad 770 is subjected to load, the pad 770 compresses, at least in directions parallel to the respective fastener, and dampens shock loads and vibration being transferred between the bracing assembly and the surface/non-structural component. In some embodiments, the pad can be made of a natural or synthetic rubber. The pad 770 also provides has the ability to deform and thus compensate for relative movement of the building and/or non-structural component with respect to the mounting point of the mount 714.

Figure 24:
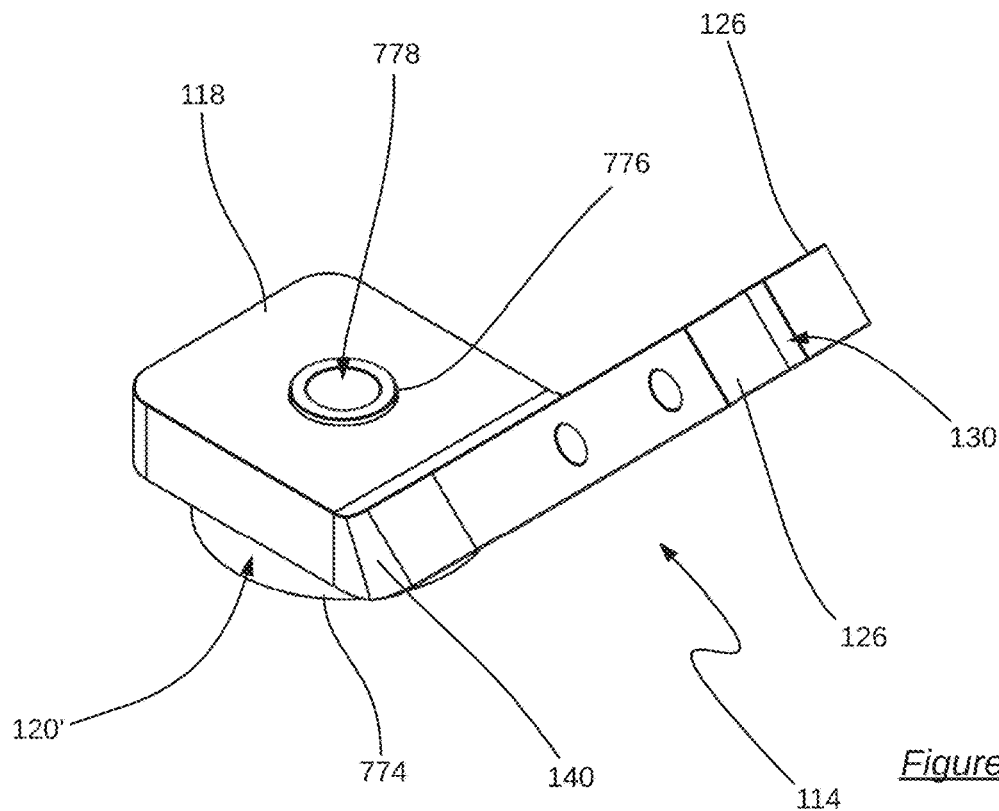
FIG. 24: is a perspective view of the mounting bracket of FIG. 11, together with a second resilient element.
Figure 25:
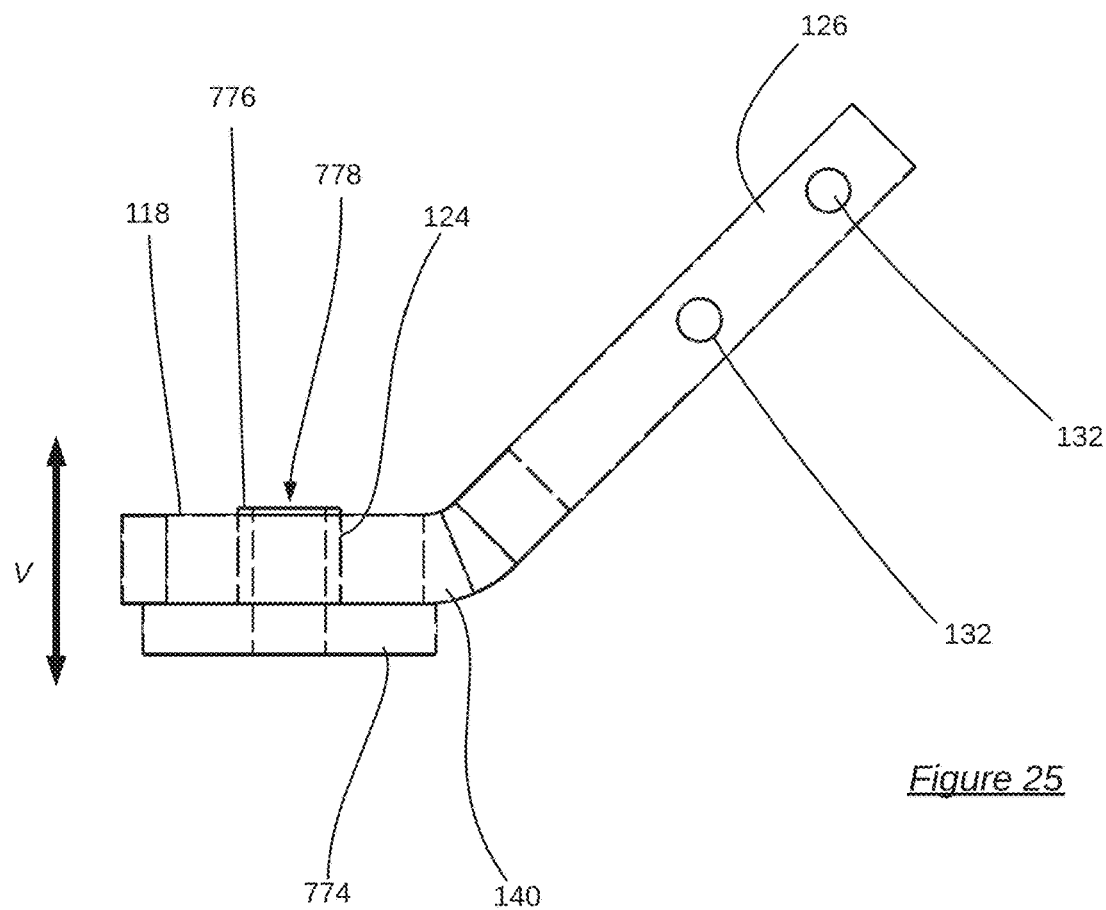
FIG. 25: is a right side view of the mounting bracket and second resilient element of FIG. 24.

FIGS. 24 and 25 show the mount 114 of FIG. 11, together with a resilient element that includes a pad 774 and a bush 776. When the mount 114 is installed in the bracing assembly, the pad 774 is positioned between the attachment portion of the mount 114 and the respective surface or non-structural component, and against the secondary mounting face 120'.

The bush 776 is configured to locate within the aperture 124 of the mount 114, and retain the resilient element to the mount 114. To this end, the bush 776 has an outer diameter that provides an interference fit with the aperture 124. The resilient element includes a through-hole 778 that extends through the pad 774 and the bush 776, and aligns with the aperture 124 of the mount 114. The respective fastener is to extend through both the aperture 124 and the through-hole 778.

The pad 774 is compressible, at least in directions parallel to the respective fastener (as indicated by double-headed arrow V in FIG. 25), and dampens shock loads and vibration being transferred between the bracing assembly and the surface/non-structural component.

In FIGS. 24 and 25, the resilient element is illustrated with the pad 774 being positioned against the secondary mounting face 120'. However, it will be appreciated that the resilient element can alternatively be installed with the pad 774 being positioned against the secondary mounting face 120 (and with the bush 776 located within the aperture 124).

Figure 26:
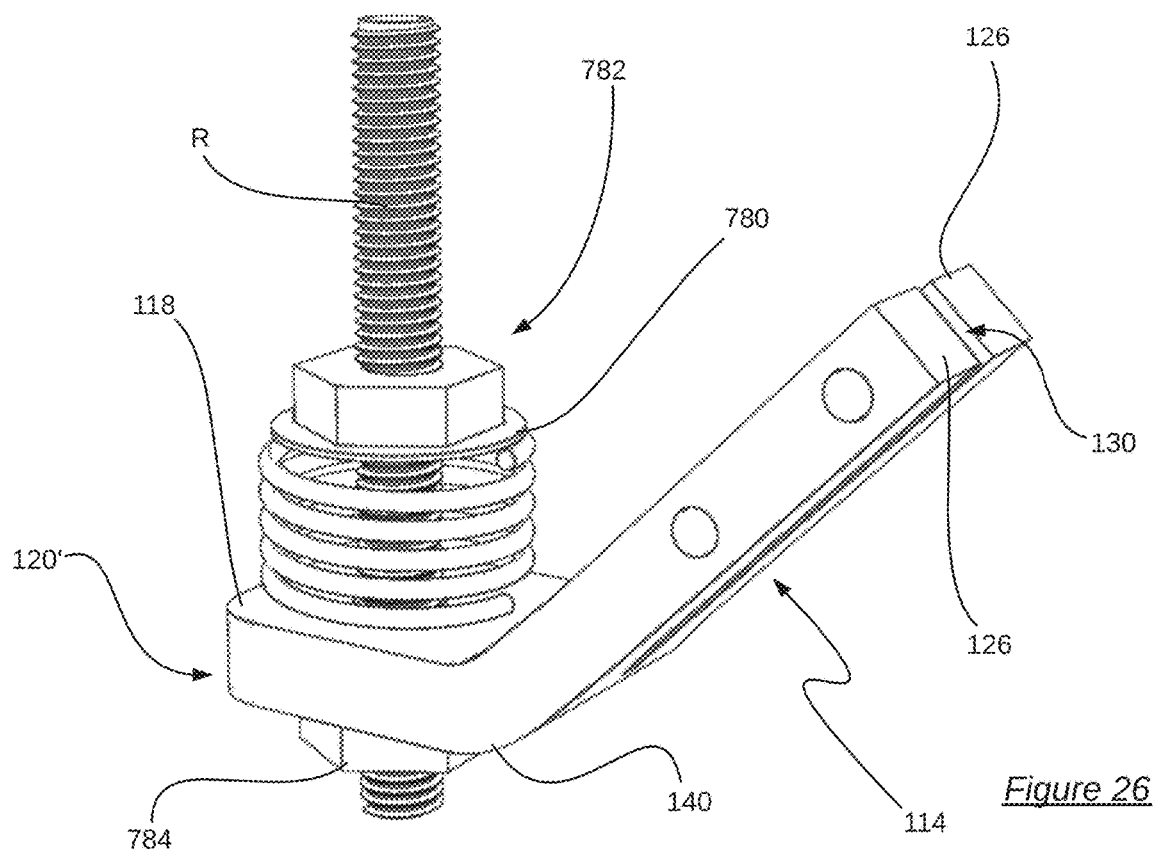
FIG. 26: is a perspective view of the mounting bracket of FIG. 11, together with a compression spring.
Figure 27:
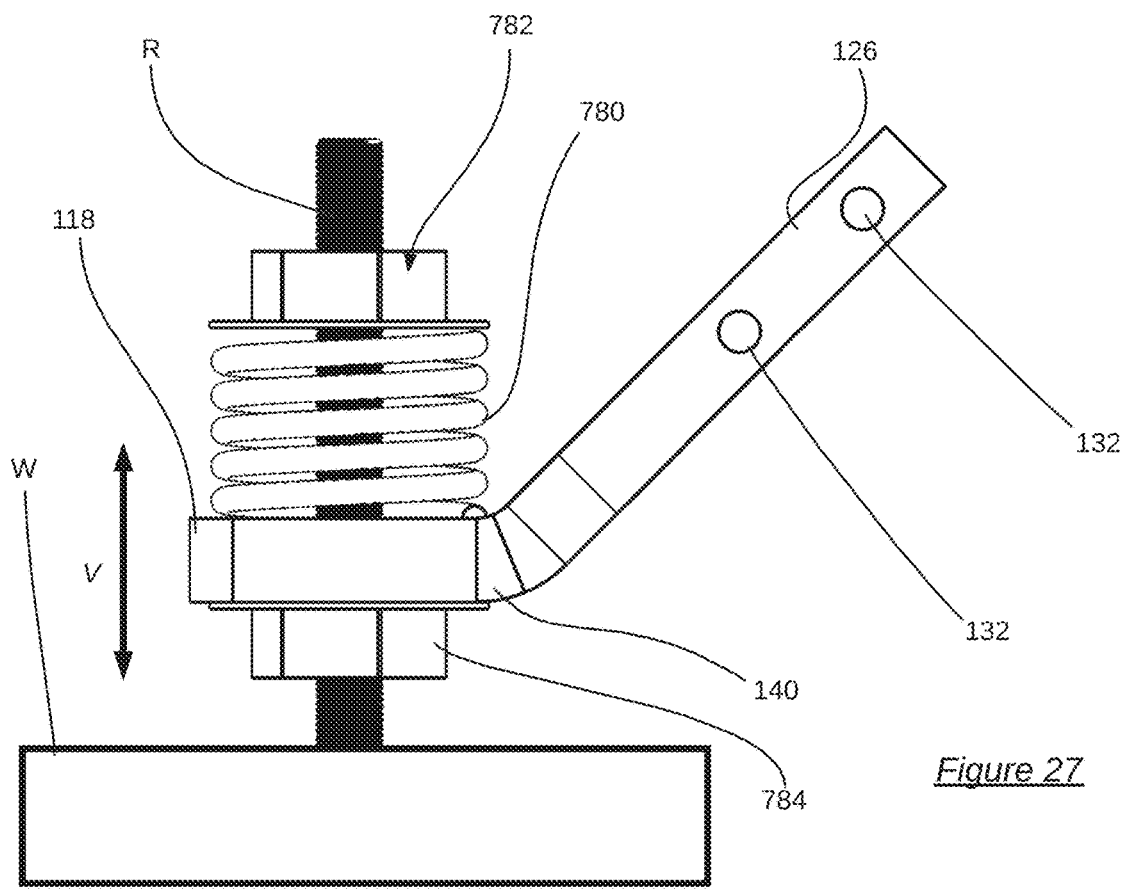
FIG. 27: is a right side view of the mounting bracket and the compression spring of FIG. 26.

FIGS. 26 and 27 show the mount 114 of FIG. 11, together with an alternative resilient element that can be included in a bracing assembly according to an embodiment of the present invention. In FIGS. 26 and 27, the resilient element is in the form of a compression spring 780, which is installed about the fastener of the respective mount. In this example, the compression spring 780 is installed about a portion of threaded rod R.

A bracing assembly that includes the compression spring 780 also includes a retaining member, which in this embodiment is in the form of a washer and locknut pair 782. The compression spring 780 is installed with a first end against the attachment portion 118 and a second end against the washer of the retaining member.

In FIG. 27, the threaded rod R protrudes upwardly from the top plate of an internal, non-structural wall W within a building. In this scenario, the top of the wall W is vertically spaced beneath the soffit of the building, allowing building services to pass over the wall W beneath the soffit. The bracing assembly incorporating the mount 114 may be secured to the soffit in order to brace the wall W laterally within the building.

In this particular example, a second washer and locknut pair 784 is installed on the threaded rod R against the secondary mounting face 120' that is oriented towards the wall W.

The arrangement shown in FIGS. 26 and 27 enables the bracing assembly to accommodate large amounts of vertical deflection of the wall W (and thus also the threaded rod R), in the direction indicated by double-headed arrow V in FIG. 27.

In some instances, bracing assemblies incorporating a compression spring as a resilient element may incorporate alternative mounts. Further, bracing assemblies incorporating a compression spring may be used in bracing other non-structural building components.

FIGS. 28 to 31 show a mount 814 for use in bracing a non-structural building component mounted adjacent a surface of a building, the mount 814 being in accordance with a ninth embodiment. The mount 814 is substantially similar to the mount 14 shown in FIGS. 4 to 10, and like components of the mount 814 have the same reference numeral with the prefix "8" replacing the prefix "1".

The connecting portion of the mount 814 defines fixing elements that each have a second mounting face. In this particular embodiment, the connecting portion has a projection 827 that is rigidly joined to the pair of arms 822 of the attachment portion. The connecting portion further has two fixing elements in the form a pair of flanges 826 that each extend from the projection 827.

Each flange 826 defines a second mounting face 829 and, in this particular embodiment, a pair of through-holes 830. The through-holes 830 extend transversely through the respective flange 826 and open onto the second mounting face 829. As will be evident from FIG. 31, the through-holes 830 are generally transverse to the projecting direction of the connecting portion (which is parallel to the centreline CO. Further, the second mounting faces 829 both face generally towards the projection 827. In this particular embodiment, the second mounting faces 829 are planar surfaces that are parallel to a plane that is defined by the central axis Y of the aperture 824 in the attachment portion.

The axes of the through-holes 830 in the flanges 826 are substantially parallel to the plane of the first mounting face 820.

As will be apparent from FIGS. 4 to 10, the second mounting faces of 829 the flanges 826 are planar. Further, the second mounting faces 829 are substantially parallel to the normal of the plane of the first mounting face 820, and also substantially orthogonal to the axes of the through-holes 830.

Figure 29:
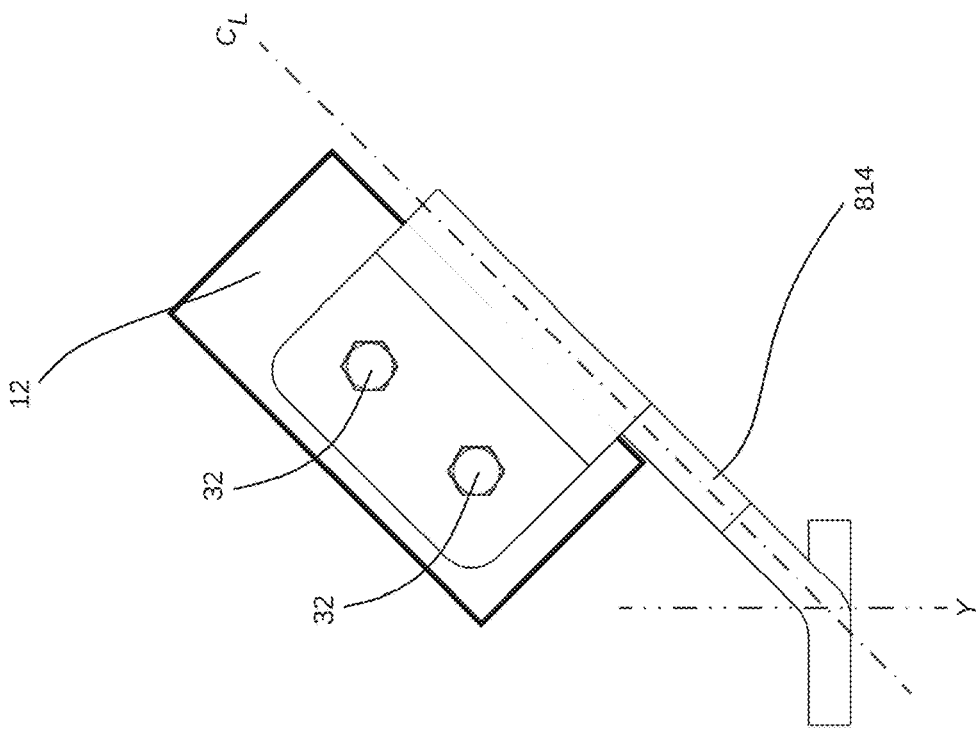
FIG. 29: is a right side view of the mounting bracket shown in FIG. 28.
Figure 28:
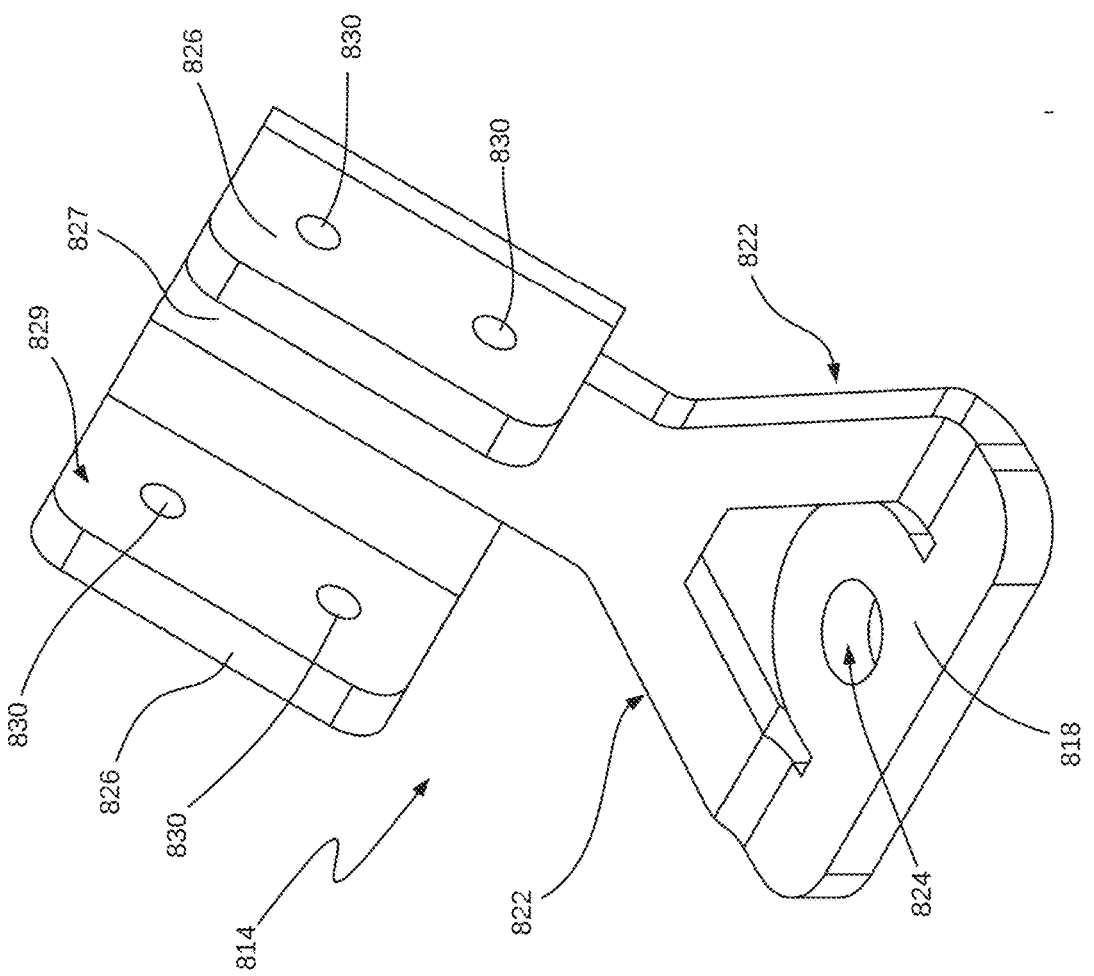
FIG. 28: is a perspective view of a mounting bracket according to a ninth embodiment of the present invention.

As shown in FIG. 29, when the mount 814 is installed in a bracing assembly according to an embodiment of the invention, the elongate member 12 is fixed to the mount 814 by locating wall portions of the elongate member 12 adjacent the second mounting faces 829. Second fasteners 32 are then passed through the through-holes 830 in one of the flanges 826 and into the respective wall portion of the elongate member 12.

Alternatively, the second fasteners can be passed through the through-holes 830 such that the tip of the respective secondary fasteners 32 bear against the elongate member 12. In this way, the elongate member 12 is effectively clamped between the two flanges 826.

The mount 814 is particularly suitable for use with an elongate member 12 that has a width that is approximately equal to, and not greater than the separation of the two second mounting faces 829. Accordingly, the elongate member 12 and mount 814 are fixable to one another on opposing sides of the elongate member 12.

FIGS. 32 and 33 show a mount 914 for use in bracing a non-structural building component mounted adjacent a surface of a building, the mount 914 being in accordance with a tenth embodiment. The mount 914 is substantially similar to the mount 814 shown in FIGS. 28 to 31, and like components of the mount 914 have the same reference numeral with the prefix "9" replacing the prefix "8".

The principal difference of the mount 914 from the mount 814 is in that the mount 914 has a single flange 926 that extends from the projection 927. It will be appreciated that when the mount 914 is installed in a bracing assembly, the secondary fasteners must extend through at least one wall of the elongate member. The threads of the secondary fasteners can engage with the flange 926 around the through-holes 930. Alternatively, the through-holes 930 can have a clearance diameter around the shanks of the secondary fasteners, in which case the heads of the secondary fasteners must bear against the flange 926, and the secondary fasteners installed so as to generate tension in the shanks.

FIGS. 34 and 35 show a mount 1014 for use in bracing a non-structural building component mounted adjacent a surface of a building, the mount 1014 being in accordance with an eleventh embodiment. The mount 1014 is substantially similar to the mount 814 shown in FIGS. 28 to 31, and like components of the mount 1014 have the same reference numeral with the prefix "10" replacing the prefix "9".

The mount 1014 is configured with the single flange 1026 is positioned such that the wall portion of the elongate member that is fixed to the mount 1014 is coincident with a plane that passes through the central axis of the aperture 1024 in the attachment portion.

It will be appreciated that the invention is not limited to the form of non-structural building component that is illustrated in the drawings. The assembly 10 can be used for any non-structural building component (or components) that are to be suspended within a building. By way of examples only, the assemblies can be used to support ductwork, data and/or electrical cable tray, variable air volume (VAV) boxes, sprinkler pipe, junction boxes, lighting, plumbing, fan coil units, and pump units.

Throughout this specification and the claims which follow, unless the context requires otherwise, the word "comprise", and variations such as "comprises" and "comprising", will be understood to imply the inclusion of a stated integer or step or group of integers or steps but not the exclusion of any other integer or step or group of integers or steps.

The reference in this specification to any prior publication (or information derived from it), or to any matter which is known, is not, and should not be taken as an acknowledgment or admission or any form of suggestion that that prior publication (or information derived from it) or known matter forms part of the common general knowledge in the field of endeavour to which this specification relates.

The invention claimed is:

1. An assembly for bracing a non-structural building component mounted adjacent a surface of a building, the assembly comprising:
    a rigid elongate member having first and second ends, and one or more substantially planar wall portions that extend at least part of the length of the elongate member from a respective end;
    a first fastener, and second fasteners;
    a first mount that includes:
        an attachment portion with a first mounting point through which the first fastener is to extend to secure the first mount to one of: the non-structural building component or the building, the attachment portion having a substantially planar first mounting face that in use of the assembly is to be oriented towards the respective non-structural building component or the surface of the building, and
        at least one connecting portion that is rigidly joined to the attachment portion and that projects away from the attachment portion in a direction that is oblique to the first mounting face, the connecting portion having two fixing elements, each having a second mounting face, and two through-holes that each extend therethrough in a direction that is generally transverse to the projecting direction of the connecting portion and opens onto the second mounting face, the two second mounting faces being substantially parallel to the normal of the plane of the first mounting face and substantially orthogonal to the axes of the through-holes, and the two fixing elements being configured so that a planar wall portion of the elongate member is locatable adjacent each of the second mounting faces, and such that second fasteners are to extend through the through-holes of the fixing elements to engage the wall portion of the elongate member and thereby rigidly fix the elongate member to the first mount;
    and
    a third fastener, and a second mount that includes a second mounting point through which the third fastener is to extend to secure the second mount to the other of the building or the non-structural building component, the second mount being fixed to, or fixable to one end of the elongate member,
    whereby, in use, the assembly is to be installed between the surface and the non-structural building component, with the first mount secured by the first fastener to one of the building and the non-structural building component, the second mount secured by the third fastener to the other of the non-structural building component and the building, and the elongate member extending between the first and second mounts and rigidly fixed thereto, and
    wherein the first mount is configured such that the elongate member is fixable to the first mount in a relative orientation in which the longitudinal direction of the elongate member is non-parallel to the centreline of the connecting portion.

2. The assembly of claim 1, wherein the second mount is releasably fixed or fixable to the elongate member.

3. The assembly of claim 1, wherein the second mount further includes:
    an attachment portion within which the second mounting point is formed, the attachment portion having a substantially planar first mounting face that in use of the assembly is to be oriented towards one of: the surface or the non-structural building component; and
    at least one connecting portion that is rigidly joined to the attachment portion and that projects away from the attachment portion in a direction that is oblique to the first mounting face, the connecting portion defining at least one fixing element that has a second mounting face, and two through-holes that each extend through the respective fixing element in a direction that is generally transverse to the projecting direction of the connecting portion and opens onto the second mounting face, the assembly further comprising fourth fasteners, and whereby the elongate member is fixable to the second mount by locating the planar wall portion of the elongate member adjacent the second mounting face of the second mount, and passing fourth fasteners through the through-holes of the second mount so as to engage the wall portion of the elongate member and thereby secure the elongate member to the second mount.

4. The assembly of claim 1, wherein the two fixing elements are in the form a pair of tines that define a slot therebetween, and each second mounting face is defined by a surface portion of a respective one of the tines, wherein the through-holes are formed in the tines so as to extend through the respective tine and open onto the slot, and whereby the elongate member is fixable to the respective mount by locating the planar wall portion of the elongate member in the slot.

5. The assembly of claim 4, wherein the height of the or each substantially planar wall portion, in a direction that is transverse to the longitudinal direction of the elongate member, is greater than the thickness of the tines.

6. The assembly of claim 4, wherein the first and/or second mount is arranged such that the centreline of the connecting portion extends through the mounting point, whereby when the mount is secured by the respective first or third fastener to one of the surface and the non-structural building component, and the elongate member is fixed to the connecting portion, tensile loads in the connecting portion that are parallel to the tines of the connecting portion extend through the respective mounting point.

7. The assembly of claim 6, wherein the attachment portion of the first and/or second mount includes:

an attachment plate that defines the first mounting face, and in which the respective mounting point is formed; and a pair of arms that extend from the attachment plate to the respective connecting portion, wherein the arms extend obliquely from the attachment plate.

8. The assembly of claim 4, wherein the axes of the through-holes in the tines are substantially parallel to the plane of the first mounting face.

9. The assembly of claim 1, wherein the connecting portion has a projection that is rigidly joined to the attachment portion, and each fixing element is in the form of a flange that extends from the projection.

10. The assembly of claim 9, wherein the axes of the through-holes in the flanges are substantially parallel to the plane of the first mounting face.

11. The assembly of claim 1, wherein the elongate member has a planar wall portion that extends the entire length of the elongate member between the first and second ends.

12. The assembly of claim 1, wherein the mounting point of the first and/or second mount includes an aperture that extends through the respective attachment portion, whereby in use of the assembly, the respective first or third fastener is positioned within the aperture.

13. The assembly of claim 1, wherein the mounting point of the first and/or second mount includes a central fixing formation, and a transverse opening through which to pass a cylindrical portion of the respective first or third fastener, wherein the mounting point is formed at the base of the transverse opening and between the central fixing formation and the mounting face, and wherein the mount is secured to the respective non-structural building component or building by securing a portion of the respective first or third fastener against the central fixing formation.

14. The assembly of claim 13, wherein the central fixing formation comprises a C-shaped depression that is shaped to receive part of the respective first or third fastener when that fastener is secured against the central fixing portion, and wherein the C-shaped depression inhibits lateral movement of that part of the respective fastener outwardly with respect to the transverse opening.

15. The assembly of claim 1, wherein the first and/or second mount has a plurality of first mounting faces so that the respective mount is securable to the respective non-structural building component or the building in multiple orientations that each have one of the first mounting faces oriented towards the respective non-structural building component or the building.

16. The assembly of claim 1, wherein the first mount has a plurality of connecting portions, wherein each connecting portion is rigidly joined to the attachment portion and projects obliquely to the first mounting face, and wherein the elongate member is one of a plurality of elongate members that are each fixable to a respective one of the connecting portions of the first mount; and a plurality of second mounts that are each joined to, or connectable to a respective one of the elongate members.

17. The assembly of claim 16, wherein the plurality of connecting portions are arranged such that the centrelines of the connecting portions all extend at a common angle to the first mounting face, and extend partly radially with respect to the mounting point.

18. The assembly of claim 16, wherein planes that extend through the centrelines of the connecting portions and that are perpendicular to the first mounting face define a line of intersection that extends through the mounting point.

19. An assembly for bracing a non-structural building component mounted adjacent a surface of a building, the assembly comprising:

a rigid elongate member having first and second ends, and one or more substantially planar wall portions that extend at least part of the length of the elongate member from a respective end;

a first mount that includes:

an attachment portion with a first mounting point through which a first fastener is to extend to secure the first mount to one of: the non-structural building component or the building, the attachment portion having a substantially planar first mounting face that in use of the assembly is to be oriented towards the respective non-structural building component or the surface of the building, and at least one connecting portion that is rigidly joined to the attachment portion and that projects away from the attachment portion in a direction that is oblique to the first mounting face, the connecting portion defining at least one fixing element that has a second mounting face, and one or more through-holes that each extend through the respective fixing element in a direction that is generally transverse to the projecting direction of the connecting portion and opens onto the second mounting face, whereby the elongate member is fixable to the first mount by locating the planar wall portion of the elongate member adjacent the second mounting face, and passing one or more second fasteners through the through-holes so as to engage the wall portion of the elongate member and thereby secure the elongate member to the first mount;
and
a second mount that includes a second mounting point through which a third fastener is to extend to secure the second mount to the other of the building or the non-structural building component, the second mount being fixed to, or fixable to one end of the elongate member,
whereby, in use, the assembly is to be installed between the surface and the non-structural building component, with the first mount secured by the first fastener to one of the building and the non-structural building component, the second mount secured by the third fastener to the other of the non-structural building component and the building, and the elongate member extending between the first and second mounts and rigidly fixed thereto, and
wherein the first mount is configured such that the elongate member is fixable to the first mount in a relative orientation in which the longitudinal direction of the elongate member is non-parallel to the centreline of the connecting portion
the height of the or each substantially planar wall portion, in a direction that is transverse to the longitudinal direction of the elongate member, is greater than the thickness of the tines, and
each tine has an inner portion that is adjacent the base of the slot, and an outer portion that extends from the inner portion to the tip of the respective tine, and wherein the width of each tine within the inner portion increases in a direction that is away from the outer portion.

* * * * *